(12) United States Patent
Qi et al.

(10) Patent No.: US 10,824,862 B2
(45) Date of Patent: Nov. 3, 2020

(54) THREE-DIMENSIONAL OBJECT DETECTION FOR AUTONOMOUS ROBOTIC SYSTEMS USING IMAGE PROPOSALS

(71) Applicant: Nuro, Inc., Menlo Park, CA (US)

(72) Inventors: Ruizhongtai Qi, Stanford, CA (US); Wei Liu, Mountain View, CA (US); Chenxia Wu, Menlo Park, CA (US)

(73) Assignee: Nuro, Inc., Mountain View, CA (US)

( * ) Notice: Subject to any disclaimer, the term of this patent is extended or adjusted under 35 U.S.C. 154(b) by 273 days.

(21) Appl. No.: 16/119,939

(22) Filed: Aug. 31, 2018

(65) Prior Publication Data

US 2019/0147245 A1 May 16, 2019

Related U.S. Application Data

(60) Provisional application No. 62/588,194, filed on Nov. 17, 2017, provisional application No. 62/586,009, filed on Nov. 14, 2017.

(51) Int. Cl.
| | | |
|---|---|---|
| *G06K 9/00* | (2006.01) | |
| *G06K 9/62* | (2006.01) | |
| *G06K 9/32* | (2006.01) | |
| *G06K 9/66* | (2006.01) | |

(52) U.S. Cl.
CPC ..... *G06K 9/00664* (2013.01); *G06K 9/00208* (2013.01); *G06K 9/00791* (2013.01); *G06K 9/3233* (2013.01); *G06K 9/6268* (2013.01); *G06K 9/6273* (2013.01); *G06K 9/66* (2013.01)

(58) Field of Classification Search
CPC .......... G06K 9/00208; G06K 9/00664; G06K 9/3233; G06K 9/6268; G06K 9/00791; G06K 9/6273; G06K 9/66
See application file for complete search history.

(56) References Cited

U.S. PATENT DOCUMENTS

| | | |
|---|---|---|
| 3,064,252 A | 11/1962 | Varela |
| 4,766,548 A | 8/1988 | Cedrone et al. |
| 4,952,911 A | 8/1990 | D'Ambrosia et al. |
| 5,128,861 A | 7/1992 | Kagami et al. |
| 5,179,843 A | 1/1993 | Cohausz et al. |
| 5,207,784 A | 5/1993 | Schwartzendruber et al. |
| 5,636,122 A | 6/1997 | Shah et al. |
| 5,844,808 A | 12/1998 | Konsmo et al. |

(Continued)

FOREIGN PATENT DOCUMENTS

| | | |
|---|---|---|
| JP | H036407 A | 1/1991 |
| JP | 2001256576 A | 9/2001 |

(Continued)

OTHER PUBLICATIONS

Curtis et al., Skype founders invent self-driving robot that can deliver groceries for L1. London Telegraph (3 pgs) (2015).

(Continued)

*Primary Examiner* — Tom Y Lu

(57) ABSTRACT

Provided herein are methods and systems for implementing three-dimensional perception in an autonomous robotic system comprising an end-to-end neural network architecture that directly consumes large-scale raw sparse point cloud data and performs such tasks as object localization, boundary estimation, object classification, and segmentation of individual shapes or fused complete point cloud shapes.

28 Claims, 29 Drawing Sheets

(56) References Cited

U.S. PATENT DOCUMENTS

| | | |
|---|---|---|
| 5,877,688 A | 3/1999 | Morinaka et al. |
| D411,814 S | 7/1999 | Chibuka et al. |
| 5,922,040 A | 7/1999 | Prabhakaran et al. |
| 6,021,394 A | 2/2000 | Takahashi et al. |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater et al. |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Gleckler et al. |
| 7,281,891 B2 | 10/2007 | Smith et al. |
| 7,521,935 B2 | 4/2009 | Uchida et al. |
| 7,534,984 B2 | 5/2009 | Gleckler |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada Gomez et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar et al. |
| 9,256,852 B1 | 2/2016 | Myllymaki |
| 9,307,383 B1 | 4/2016 | Patrick et al. |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald et al. |
| 9,552,564 B1 | 1/2017 | Martenis et al. |
| 9,613,346 B2 | 4/2017 | Crow et al. |
| 9,684,914 B1 | 6/2017 | Porter et al. |
| 9,741,010 B1 | 8/2017 | Heinla et al. |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1 | 2/2018 | Kumar et al. |
| 9,916,703 B2 | 3/2018 | Douillard et al. |
| 9,984,525 B2 | 5/2018 | Will et al. |
| 10,029,787 B1 | 7/2018 | Lesser et al. |
| 10,120,384 B2 | 11/2018 | Wilkinson et al. |
| 2002/0023594 A1 | 2/2002 | Greene et al. |
| 2003/0209375 A1 | 11/2003 | Suzuki et al. |
| 2004/0181570 A1 | 9/2004 | Kaneko et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler et al. |
| 2007/0235465 A1 | 10/2007 | Walker et al. |
| 2009/0092277 A1* | 4/2009 | Ofek .................. G06K 9/00664 382/100 |
| 2010/0219953 A1 | 9/2010 | Bloy et al. |
| 2010/0228405 A1 | 9/2010 | Morgal et al. |
| 2010/0234991 A1 | 9/2010 | Zini et al. |
| 2010/0301056 A1 | 12/2010 | Wolfe et al. |
| 2011/0130134 A1 | 6/2011 | Van Rysselberghe et al. |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0022051 A1 | 1/2014 | Levien et al. |
| 2014/0136414 A1 | 5/2014 | Abhyanker |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1 | 12/2014 | Ibanez-Guzman et al. |
| 2014/0380264 A1 | 12/2014 | Misra et al. |
| 2015/0006005 A1 | 1/2015 | Yu et al. |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1 | 6/2015 | Skaaksrud et al. |
| 2015/0170099 A1 | 6/2015 | Beach-Drummond |
| 2015/0348112 A1 | 12/2015 | Ramanujam et al. |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen et al. |
| 2016/0300187 A1 | 10/2016 | Kashi et al. |
| 2016/0334797 A1 | 11/2016 | Ross et al. |
| 2016/0357187 A1 | 12/2016 | Ansari |
| 2016/0357188 A1 | 12/2016 | Ansari et al. |
| 2016/0358477 A1 | 12/2016 | Ansari et al. |
| 2016/0363991 A1 | 12/2016 | Schlecht et al. |
| 2017/0011580 A1 | 1/2017 | Huang et al. |
| 2017/0057516 A1 | 3/2017 | Gordon et al. |
| 2017/0069071 A1* | 3/2017 | Jung .................. G06T 7/194 |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124547 A1 | 5/2017 | Natarajan et al. |
| 2017/0124781 A1 | 5/2017 | Douillard et al. |
| 2017/0132934 A1 | 5/2017 | Kentley et al. |
| 2017/0132960 A1 | 5/2017 | Kis-Benedek Pinero et al. |
| 2017/0153714 A1 | 6/2017 | Gao et al. |
| 2017/0193434 A1 | 7/2017 | Shah et al. |
| 2017/0227962 A1 | 8/2017 | Cesarano et al. |
| 2017/0248964 A1 | 8/2017 | Kentley et al. |
| 2017/0255198 A1 | 9/2017 | Rodriguez et al. |
| 2017/0261977 A1 | 9/2017 | High et al. |
| 2017/0262790 A1 | 9/2017 | Khasis |
| 2017/0282859 A1 | 10/2017 | Grimm et al. |
| 2017/0313421 A1 | 11/2017 | Gil et al. |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |
| 2018/0099602 A1 | 4/2018 | Salter et al. |
| 2018/0101818 A1 | 4/2018 | Simms et al. |
| 2018/0134200 A1 | 5/2018 | Wilkinson et al. |
| 2018/0144300 A1 | 5/2018 | Wiechers et al. |
| 2018/0157984 A1 | 6/2018 | O'Herlihy et al. |
| 2018/0158018 A1 | 6/2018 | Luckay et al. |
| 2018/0165728 A1 | 6/2018 | McDonald et al. |
| 2018/0189716 A1 | 7/2018 | Crone et al. |
| 2018/0194411 A1 | 7/2018 | Liivik et al. |
| 2018/0196416 A1 | 7/2018 | Iagnemma et al. |
| 2018/0196417 A1 | 7/2018 | Iagnemma et al. |
| 2018/0211541 A1 | 7/2018 | Rakah et al. |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti et al. |
| 2018/0330313 A1 | 11/2018 | Clarke et al. |
| 2018/0349872 A1 | 12/2018 | Ahmed et al. |

(56) References Cited

U.S. PATENT DOCUMENTS

| | | | |
|---|---|---|---|
| 2018/0373246 | A1 | 12/2018 | Laughlin et al. |
| 2018/0374002 | A1 | 12/2018 | Li et al. |
| 2019/0023236 | A1 | 1/2019 | Webb et al. |

FOREIGN PATENT DOCUMENTS

| | | |
|---|---|---|
| JP | 2006177843 A | 7/2006 |
| WO | WO-2013025803 A1 | 2/2013 |
| WO | WO-2017014544 A1 | 1/2017 |
| WO | WO-2017064202 A1 | 4/2017 |
| WO | WO-2019018695 A1 | 1/2019 |
| WO | WO-2019023518 A1 | 1/2019 |
| WO | WO-2019023519 A1 | 1/2019 |
| WO | WO-2019023521 A1 | 1/2019 |
| WO | WO-2019023522 A1 | 1/2019 |
| WO | WO-2019023615 A1 | 1/2019 |
| WO | WO-2019023686 A1 | 1/2019 |

OTHER PUBLICATIONS

Emerging Tech. Domino's has built a self-driving pizza delivery robot. Available at https://www.digitaltrends.com/cool-tech/dominos-pizza-delivery-robot/ (12 pgs) (2016).

Navarro et al. A mobile robot vending machine for beaches based on customer's preferences and multivariate methods. Procedia—Social and Behavioral Sciences 175:122-129 (2015).

Olson . Self-Driving Robots Will Start Delivering Food For Just Eat And Others. Available at https://www.forbes.com/sites/parmyolson/2016/07/05/self-driving-robots-food-delivery-just-eat/#6e3e834b280d (3 pgs) (2016).

Peters. The Grocery Store, of the Future is Mobile, Self-Driving and Run by AI. Fast Company (6 pgs.) (Jun. 13, 2017).

Pettitt. Forget delivery drones, meet your new delivery robot. Available at https://www.cnbc.com/2015/11/02/forget-delivery-drones-meet-your-new-delivery-robot.html (5 pgs) (2015).

Ratkov. Robotic Vending Machines Anthonyratkkov.com/robotics/robotic vending machines (2 pgs.) (2010).

U.S. Appl. No. 16/046,954 Office Action dated Nov. 29, 2018.
U.S. Appl. No. 16/046,967 Office Action dated Dec. 4, 2018.
U.S. Appl. No. 16/046,978 Office Action dated Feb. 28, 2019.
U.S. Appl. No. 16/046,980 Office Action dated Feb. 27, 2019.
U.S. Appl. No. 16/047,901 Office Action dated Dec. 11, 2018.

Westaway. Meet the robot built to deliver your shopping. Starship Technologies' "local delivery robot" is semi-autonomous, covered in cameras and ready to bring food to your door. Available at https://www.cnet.com/news/meet-the-robot-thats-built-to-deliver-your-shopping/ (4 pgs.) (2016).

American National Standard for Safe Use of Lasers. ANSI Z1136.1-2000 (§4.5.1.5; 4.5.1.3-4 and p. 5) (19 pgs) (2000).

AN/TPS-43 Radar System Westinghouse. Westinghouse (pp. 3, 4, 6, 9 & 14) (14 pgs) (2007).

Chen et al. 3d object proposals for accurate object class detection. In Advances in Neural Information Processing Systems, pp. 424-432 (2015).

Chen et al. Monocular 3d object detection for autonomous driving. In Proceedings of the IEEE Conference on Computer Vision and Pattern Recognition, pp. 2147-2156 (2016).

Chen et al. Multi-view 3d object detection network for autonomous driving. In IEEE CVPR, pp. 1907-1915 (2017).

Co-pending U.S. Appl. No. 16/040,432, filed Jul. 19, 2018.
Co-pending U.S. Appl. No. 16/040,437, filed Jul. 19, 2018.
Co-pending U.S. Appl. No. 16/040,446, filed Jul. 19, 2018.
Co-pending U.S. Appl. No. 16/046,954, filed Jul. 26, 2018.
Co-pending U.S. Appl. No. 16/046,967, filed Jul. 26, 2018.
Co-pending U.S. Appl. No. 16/046,978, filed Jul. 26, 2018.
Co-pending U.S. Appl. No. 16/046,980, filed Jul. 26, 2018.
Co-pending U.S. Appl. No. 16/047,901, filed Jul. 27, 2018.
Co-pending U.S. Appl. No. 16/048,124, filed Jul. 27, 2018.

Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).

Engelcke et al. Vote3deep: Fast object detection in 3d point clouds using efficient convolutional neural networks. In Robotics and Automation (ICRA), 2017 IEEE International Conference on, pp. 1355-1361 (2017).

Food and Drugs Rule—Performance Standards for Light-Emitting Products 21 C.F.R. § 1040.10 (19 pgs) (2005).

Fox. vol. 6: Active Electro-Optical Systems. The Infrared & Electro-Optical Systems Handbook. (326 pgs) (1993).

Geiger et al. Vision meets robotics: The KITTI dataset. The International Journal of Robotics Research 32(11):1231-1237 (2013).

Girshick et al. Rich feature hierarchies for accurate object detection and semantic segmentation. In Computer Vision and Pattern Recognition (CVPR) 2014 IEEE Conference on, pp. 580-587 (2014).

Gustavson. Diode-laser radar for low cost weapon guidance. SPIE 1633(VII):21-32 (pp. 21, 27, 28, 31 & Fig. 3.3-1) (1992).

Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).

Kilpela. Precise pulsed time-of-flight laser range finder for industrial distance measurements. Review of Scientific Instruments 72:2197 (Apr. 2001).

Lahoud et al. 2d-driven 3d object detection in rgb-d images. In Proceedings of the IEEE Conference on Computer Vision and Pattern Recognition, pp. 4622-4630 (2017).

Liu et al. SSD: Single shot multibox detector. In European conference on computer vision, pp. 21-37. Springer (2016).

Maturana et al. Voxnet: A 3d convolutional neural network for real-time object recognition. In IEEE/RSJ International Conference on Intelligent Robots and Systems (7 pgs) (Sep. 2015).

Mousavian et al. 3d bounding box estimation using deep learning and geometry. In Computer Vision and Pattern Recognition (CVPR), pp. 7074-7082 (2016).

PCT/US2018/042967 International Search Report and Written Opinion dated Sep. 26, 2018.
PCT/US2018/043986 International Search Report and Written Opinion dated Oct. 23, 2018.
PCT/US2018/043987 International Search Report and Written Opinion dated Oct. 2, 2018.
PCT/US2018/043989 International Search Report and Written Opinion dated Oct. 5, 2018.
PCT/US2018/043990 International Search Report and Written Opinion dated Oct. 5, 2018.
PCT/US2018/044155 International Search Report and Written Opinion dated Oct. 15, 2018.
PCT/US2018/044248 International Search Report and Written Opinion dated Oct. 24, 2018.

Qi et al. Pointnet++: Deep hierarchical feature learning on point sets in a metric space. NIPS (14 pgs) (2017).

Qi et al. Frustum PointNets for 3D Object Detection from RGB-D Data. Available from https://arxiv.org/pdf/1711.08488v1.pdf (15 pgs.) (Nov. 2017).

Qi et al. Frustum PointNets for 3D Object Detection from RGB-D Data. In Computer Vision and Pattern Recognition (CVPR), pp. 918-927 (Apr. 2018).

Qi et al. Pointnet: Deep learning on point sets for 3d classification and segmentation. Proc. Computer Vision and Pattern Recognition (CVPR), pp. 652-660 (2017).

Qi et al. Volumetric and multi-view cnns for object classification on 3d data. In Proceedings Computer Vision and Pattern Recognition (CVPR), pp. 5648-5656 (2016).

Ren et al. Accurate single stage detector using recurrent rolling convolution. In Computer Vision and Pattern Recognition (CVPR), pp. 5420-5428 (2017).

Ren et al. Faster r-cnn: Towards real-time object detection with region proposal networks. In Advances in neural information processing systems, pp. 91-99 (2015).

(56) References Cited

OTHER PUBLICATIONS

Ren et al. Three-dimensional object detection and layout prediction using clouds of oriented gradients. In Proceedings of the IEEE Conference on Computer Vision and Pattern Recognition, pp. 1525-1533 (2016).
Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).
Riegler et al. Octnet: Learning deep 3d representations at high resolutions. In Computer Vision and Pattern Recognition (CVPR), pp. 3577-3586 (2016).
Skolnik. Introduction to Radar Systems Handbook. McGraw-Hill Book Company. (590 pgs)(2d ed. 1980).
Skolnik. Radar Handbook. McGraw-Hill Book Company (1.18, 20.6 & 20.7-8) (846 pgs)(2d ed. 1990).
Song et al. Deep sliding shapes for amodal 3d object detection in rgb-d images. In Proceedings of the IEEE Conference on Computer Vision and Pattern Recognition, pp. 808-816 (2016).
Song et al. Sliding shapes for 3d object detection in depth images. In Computer Vision-ECCV 2014, pp. 634-651 (2014).
Song et al. Sun rgb-d: A rgb-d scene understanding benchmark suite. In Proceedings of the IEEE Conference on Computer Vision and Pattern Recognition, pp. 567-576 (2015).
Su et al. Multi-view convolutional neural networks for 3d shape recognition. In Proceedings of the IEEE Conference on Computer Vision and Pattern Recognition, pp. 945-953 (2015).
U.S. Appl. No. 16/040,446 Office Action dated Oct. 17, 2018.
U.S. Appl. No. 16/048,124 Office Action dated Nov. 1, 2018.
Wang et al. O-cnn: Octree-based convolutional neural networks for 3d shape analysis. ACM Transactions on Graphics (TOG) 36(4):72 (2017).
Wu et al. 3d shapenets: A deep representation for volumetric shapes. In Proceedings of the IEEE Conference on Computer Vision and Pattern Recognition, pp. 1912-1920 (2015).
Xiang et al. Data-driven 3d voxel patterns for object category recognition. In Proceedings of the IEEE Conference on Computer Vision and Pattern Recognition, pp. 1903-1911 (2015).
Yu et al. Vehicle detection and localization on birds eye view elevation images using convolutional neural network. 2017 IEEE International Symposium on Safety, Security and Rescue Robotics (SSRR) Inspec Accession No. 17315970 (2017).

\* cited by examiner

THREE-DIMENSIONAL OBJECT DETECTION FOR AUTONOMOUS ROBOTIC SYSTEMS USING IMAGE PROPOSALS

CROSS-REFERENCE

This application claims the benefit of U.S. Provisional Application No. 62/586,009, filed Nov. 14, 2017, and U.S. Provisional Application No. 62/588,194, filed on Nov. 17, 2017, which applications are incorporated herein by reference in their entireties.

BACKGROUND OF THE INVENTION

A great amount of attention and resources have been devoted towards object detection, recognition, and instance segmentation. In additional to two-dimensional boundaries and two-dimensional pixel masks, three dimensional computer vision systems and methods are being developed for such applications such as autonomous driving and augmented reality. As the use of three-dimensional depth sensors becomes more widespread within devices such as mobile phones and personal vehicles, the necessity to efficiently and accurately analyze the 3D data created by such sensors to perform object detection, classification, and localization becomes of utmost importance.

Currently, the data collected by three-dimensional depth sensors, known as a point cloud, are converted to images by projection or to volumetric grids by quantization. This data conversion, however, may obscure 3D patterns and invariances of the data.

Some methods involve applying a convolutional network to the collected three-dimensional depth data through deep net architectures or PointNets, to classify objects and semantic segmentations. Although PointNets are capable of classifying a three-dimensional depth data to predicting semantic class, such a technology has yet to be used for instance-level 3D object detection. The challenge with such a task, however, is that the computational complexity of object recognition and classification grows cubically with respect to resolution, which may be too expensive and time intensive for use in large three dimensional scenes.

SUMMARY OF THE INVENTION

In contrast to the current state-of-the-art, the methods disclosed herein enables direct analysis of three-dimensional data by reducing the number of point cloud coordinates to a frustum of three-dimensional depth data. First, rotating and translating the point cloud data, to a canonical frame allows the deep learning algorithms to ignore irrelevant perspective data, whereby 3D geometry patterns become more evident. Second, applying the learning algorithm to the three-dimensional, not the two-dimensional data, allows for the parameterized and tailoring of the learning engines by relying on naturally occurring geometric features, such as repetition, planarity, and symmetry.

Several methods currently employ deep learning techniques to analyze and extract information from point cloud data. Some methods employ point cloud data as images, such as, for example, depth map or rasterized data, and apply a convolutional neural network (CNN) for segmentation or classification. Other methods convert voxelized point cloud into volumetric grids and generalized images CNNs to 3D CNNs.

However, 3D point clouds formed from scanning an object or scene only capture the surface of an object, and thus comprise a sparse data set. Further, 3D point clouds often exhibit a low sample point density due to sensor sampling limitations. Some 3D CNN or neural network architectures have been designed in attempts to overcome the sparseness of the 3D point cloud data set. Although other methods use a neural network to merge extracted hand-crafted features from the point cloud data and the 3D data for specific recognition tasks, such methods may be too time and resource intensive to perform in real-time.

As such, there is a current unmet need for a neural network architecture that directly consumes large-scale raw sparse point cloud data and performs such tasks as object classification and segmentation of individual shapes or fused complete point cloud shapes. Further, there is need for an end-to-end network that performs 3d localization and 3d box estimation.

In one aspect, disclosed herein a computer-implemented method of implementing three-dimensional perception in an autonomous robotic system, the method comprising: receiving, at a processor, two-dimensional image data from an optical camera; generating, by the processor, an attention region in the two-dimensional image data, the attention region marking an object of interest; receiving, at the processor, three-dimensional depth data from a depth sensor, the depth data corresponding to the image data; extracting, by the processor, a three-dimensional frustum from the depth data corresponding to the attention region; applying, by the processor, a deep learning model to the frustum to generate and regress an oriented three-dimensional boundary for the object of interest; and classify the object of interest based on a combination of features from the attention region of the two-dimensional image data and the three-dimensional depth data within and around the regressed boundary.

In some embodiments, the autonomous robotic system is an autonomous vehicle. In some embodiments, the two-dimensional image data is RGB image data. In some embodiments, the two-dimensional image data is IR image data. In some embodiments, the depth sensor comprises a LiDAR. In some embodiments, the three-dimensional depth data comprises a sparse point cloud. In some embodiments, the depth sensor comprises a stereo camera or a time-of-flight sensor. In some embodiments, the three-dimensional depth data comprises a dense depth map. In some embodiments, the deep learning model comprises a PointNet. In some embodiments, the deep learning model comprises a three-dimensional convolutional neural network on voxelized volumetric grids of the point cloud in frustum. In some embodiments, the deep learning model comprises a two-dimensional convolutional neural network on bird's eye view projection of the point cloud in frustum. In some embodiments, the deep learning model comprises a recurrent neural network on the sequence of the three-dimensional points from close to distant. In some embodiments, the classifying comprises semantic classification to apply a category label to the object of interest.

A second aspect provided herein is an autonomous robotic system comprising: an optical camera, a depth sensor, a memory, and at least one processor configured to: receive two-dimensional image data from the optical camera; generate an attention region in the two-dimensional image data, the attention region marking an object of interest; receive three-dimensional depth data from the depth sensor, the depth data corresponding to the image data; extract a three-dimensional frustum from the depth data corresponding to the attention region; apply a deep learning model to the frustum to: generate and regress an oriented three-dimensional boundary for the object of interest; and classify the object of interest based on a combination of features from the attention region of the two-dimensional image data and the three-dimensional depth data within and around the regressed boundary.

In some embodiments, the autonomous robotic system is an autonomous vehicle. In some embodiments, the two-dimensional image data is RGB image data. In some embodiments, the two-dimensional image data is IR image data. In some embodiments, the depth sensor comprises a LiDAR. In some embodiments, the three-dimensional depth data comprises a sparse point cloud. In some embodiments, the depth sensor comprises a stereo camera or a time-of-flight sensor. In some embodiments, the three-dimensional depth data comprises a dense depth map. In some embodiments, the deep learning model comprises a PointNet. In some embodiments, the deep learning model comprises a three-dimensional convolutional neural network on voxelized volumetric grids of the point cloud in frustum. In some embodiments, the deep learning model comprises a two-dimensional convolutional neural network on bird's eye view projection of the point cloud in frustum. In some embodiments, the deep learning model comprises a recurrent neural network on the sequence of the three-dimensional points from close to distant. In some embodiments, the classifying comprises semantic classification to apply a category label to the object of interest.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION OF THE INVENTION

Methods of Implementing Three-Dimensional Perception in an Autonomous Robotic System In one aspect, disclosed herein a computer-implemented method of implementing three-dimensional perception in an autonomous robotic system, the method comprising: receiving, at a processor, two-dimensional image data from an optical camera; generating, by the processor, an attention region in the two-dimensional image data, the attention region marking an object of interest; receiving, at the processor, three-dimensional depth data from a depth sensor, the depth data corresponding to the image data; extracting, by the processor, a three-dimensional frustum from the depth data corresponding to the attention region; applying, by the processor, a deep learning model to the frustum to generate and regress an oriented three-dimensional boundary for the object of interest; and classify the object of interest based on a combination of features from the attention region of the two-dimensional image data and the three-dimensional depth data within and around the regressed boundary. In some embodiments, the autonomous robotic system is an autonomous vehicle.

In some embodiments, the methods herein converts RGB-D data comprising a red-green-blue (RBG) image with the corresponding three-dimensional depth data, into a three-dimensional boundary with a classification. In some embodiments, the three dimensional depth data is obtained from a LiDAR or an alternative depth sensor, and is represented as a point cloud. In some embodiments, the projection matrix is known so that the 3D frustum can be extracted from the 2D image. In some embodiments, object is represented by a class and an amodal three-dimensional boundary which bounds the complete object even if a part of the object is occluded or truncated. The 3D box is parameterized by its size h, w, l, center $c_x$, $c_y$, $c_z$, and orientation θ, φ, ψ relative to a predefined canonical pose for each category. In some embodiments, only the h angle θ around the up-axis are considered for orientation.

Figure 1:
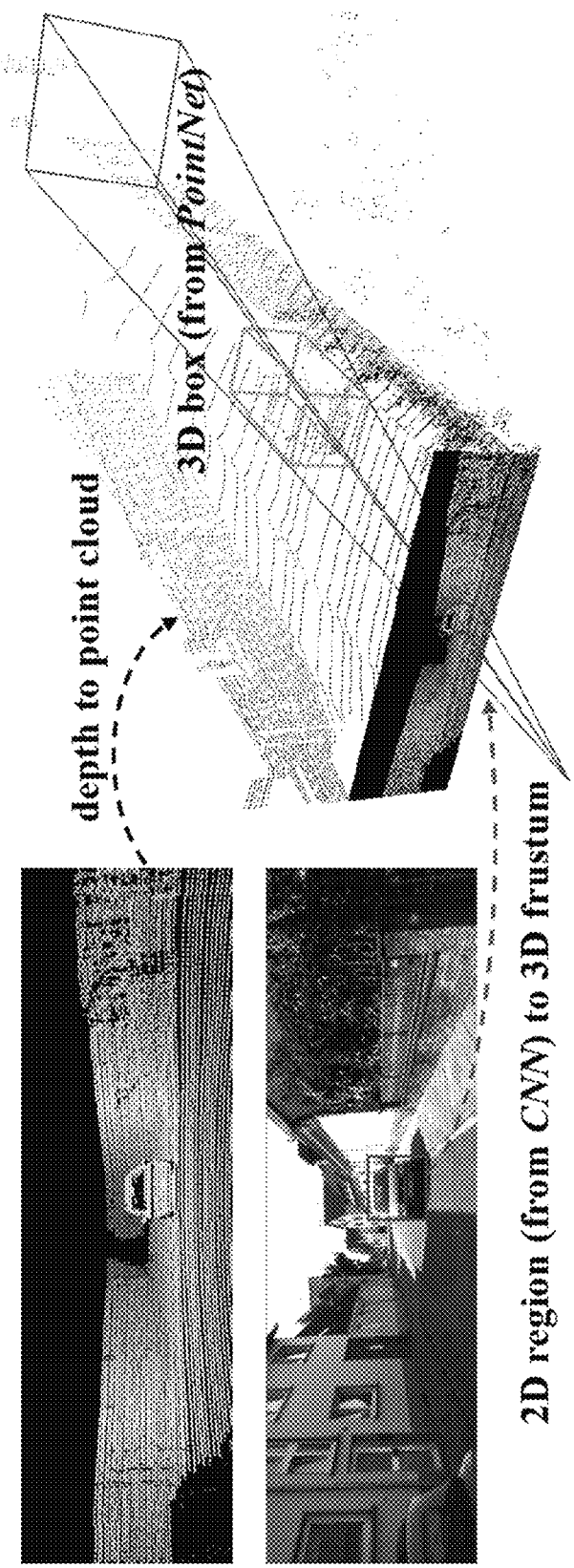
FIG. 1 shows a non-limiting schematic diagram of a computer-implemented method of implementing three-dimensional perception in an autonomous robotic system.
Figure 2:
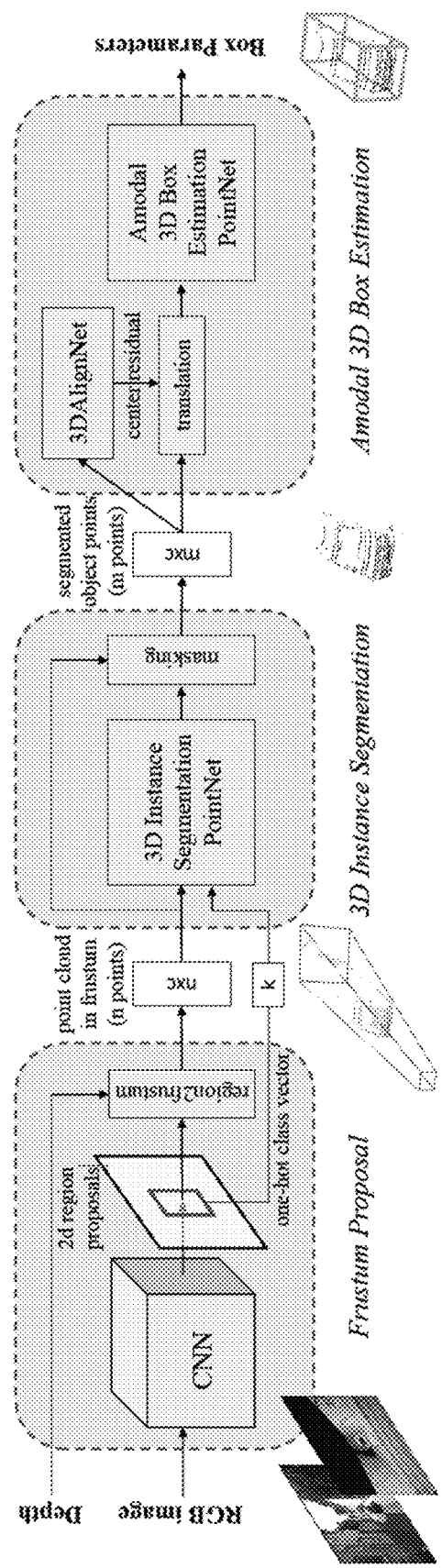
FIG. 2 shows a non-limiting flow chart of a computer-implemented method of implementing three-dimensional perception in an autonomous robotic system.

A non-limiting schematic diagram of a computer-implemented method of implementing three-dimensional perception in an autonomous robotic system is shown in FIG. 1. FIG. 2 shows a non-limiting flow chart of a computer-implemented method of implementing three-dimensional perception in an autonomous robotic system.

Figure 3:
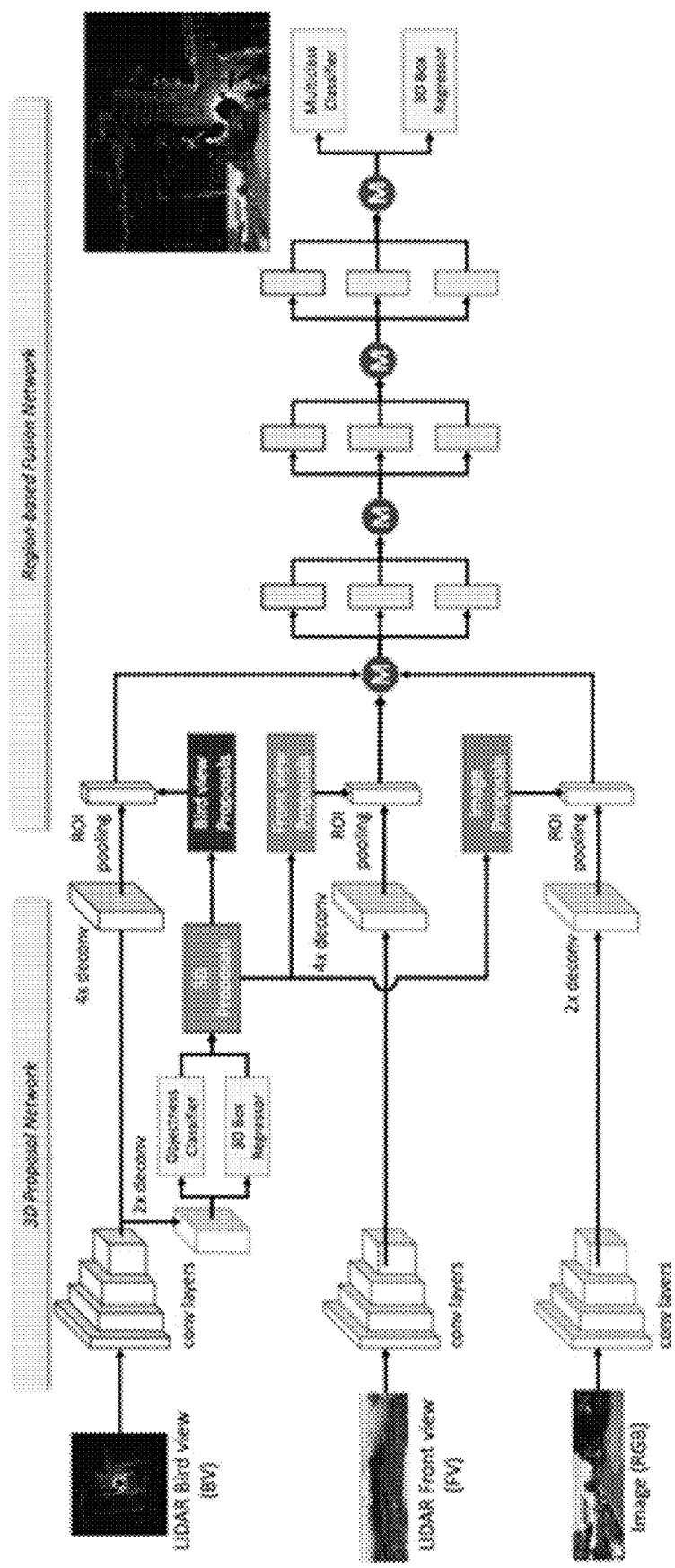
FIG. 3 shows a non-limiting schematic diagram of a multi-view computer-implemented method of implementing three-dimensional perception in an autonomous robotic system.

An exemplary diagram of a multi-view computer-implemented method of implementing three-dimensional perception in an autonomous robotic system is shown in FIG. 3.

The methods of implementing three-dimensional perception in an autonomous robotic system herein are more effective and efficient, because extracting a three-dimensional frustum from the three-dimensional depth data using the attention region reduces the amount of data used in the analysis and learning processes. Additionally, because two objects cannot coexist in the same physical space, objects within the two and three dimensional data can be distinguished by calculating and comparing the location of their centroids.

Two-Dimensional Image Data

In some embodiments, the two-dimensional image data is RGB image data. In some embodiments, the two-dimensional image data comprises IR image data, thermal image data, greyscale image data, black and white data, or any combination thereof. In some embodiments, the two-dimensional image data as H×W×3 array of pixels.

Figure 12:
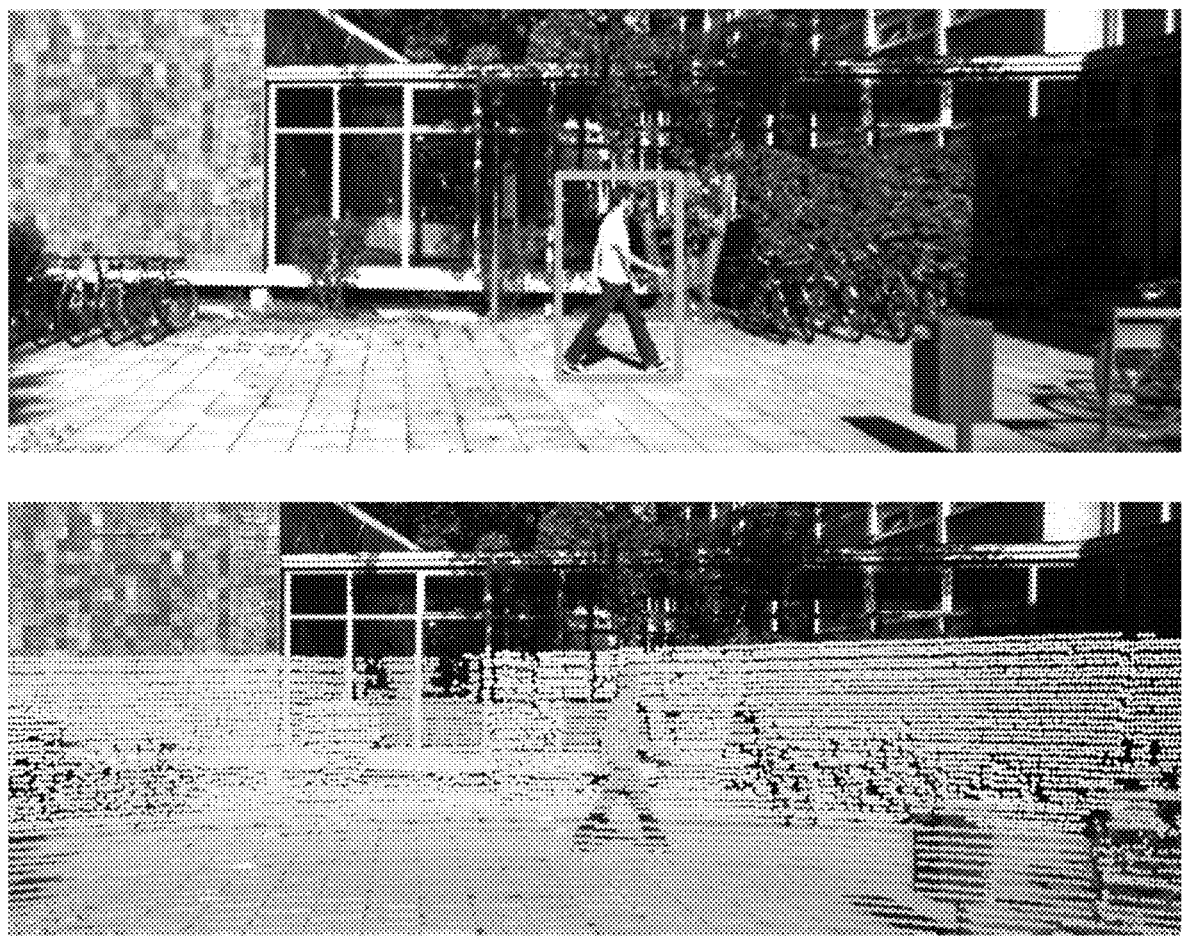
FIG. 12 shows a non-limiting example of a front view image and LiDAR point cloud.

In some embodiments, per FIG. 12, the two-dimensional image data comprises a front view image, wherein the image comprises a vertical plane. Per FIG. 12, the two dimensional image may be supplemented by three-dimensional image data from the same point of view.

Three-Dimensional Image Data

In some embodiments, the depth sensor comprises a LiDAR. In some embodiments, the three-dimensional depth data comprises a sparse point cloud. In some embodiments, the depth sensor comprises a stereo camera or a time-of-flight sensor. In some embodiments, the depth sensor comprises a LiDAR. In some embodiments, the three-dimensional depth data comprises a dense depth map. In some embodiments, the three-dimensional depth data is represented as an N×C array of unordered rows, wherein N is number of points which may vary across frames, and C is number of feature channels for each point. In some embodiments, the feature channel comprises XYZ coordinates. In some embodiments, the feature channel further comprises LiDAR intensity and/or color. In some embodiments, a point cloud is a format of three-dimensional depth data comprising a plurality of points, wherein each point is defined by Cartesian or polar coordinates. In some embodiments, point cloud data is less organized than other 3D representations such as meshes and volumetric grids.

In some embodiments, the three-dimensional depth data comprises RGB-D data comprising a red-green-blue (RBG) image with the corresponding three-dimensional depth data comprising an image channel in which each pixel relates to a distance between the image plane and the corresponding object in the RGB image.

In some embodiments, the methods and systems herein further comprise a calibration between the two-dimensional image data and the three-dimensional depth data.

Deep Learning Processes

In some embodiments, the deep learning model comprises a PointNet. In some embodiments, the deep learning model comprises a three-dimensional convolutional neural network on voxelized volumetric grids of the point cloud in frustum. In some embodiments, the deep learning model comprises a two-dimensional convolutional neural network on bird's eye view projection of the point cloud in frustum. In some embodiments, the deep learning model comprises a recurrent neural network on the sequence of the three-dimensional points from close to distant.

In some embodiments, at least one of a regioning, a frustum, a boundary, and a classifying process are used for generating an attention region in the two-dimensional image data, extracting a three-dimensional frustum from the depth data corresponding to the attention region, and generating an oriented three-dimensional boundary for the object of interest, and classifying the object of interest based on a combination of features from the attention region of the two-dimensional image data and the three-dimensional depth data within and around the regressed boundary, respectively. In some embodiments, the regioning and boundary processes are based on a PointNet architecture and are jointly optimized.

In some embodiments, one or more of the learning modules are trained by supervised learning with provided ground-truth objects of interest, attention regions, and oriented three-dimensional boundaries.

Rejoining Process

In some embodiments, a regioning process is used for generating an attention region in the two-dimensional image data.

In some embodiments, the attention region comprises a two-dimensional boundary overlaid onto the two-dimensional image data which describes a horizontal and vertical region of the object of interest. In some embodiments, the attention region further comprises at least one of a category label and a confidence score. In some embodiments, the regioning process further applies a semantic class comprising a category label to the object of interest. In some embodiments, the regioning process is trained with weights on ImageNets and COCO.

In some embodiments, the regioning process is based on a Single Shot MultiBox Detector (SSD) architecture, whose efficiency is optimized by cutting the number of channels in convolution layers by half. In some embodiments, the regioning process is trained on ImageNet, Faster-RCNN, FPN, or YOLO and fine-tuned on images from 3D object detection datasets.

Non-limiting examples of attention regions 1401 generated by the regioning process are shown in FIGS. 14-18.

Frustum Process

Figure 13:
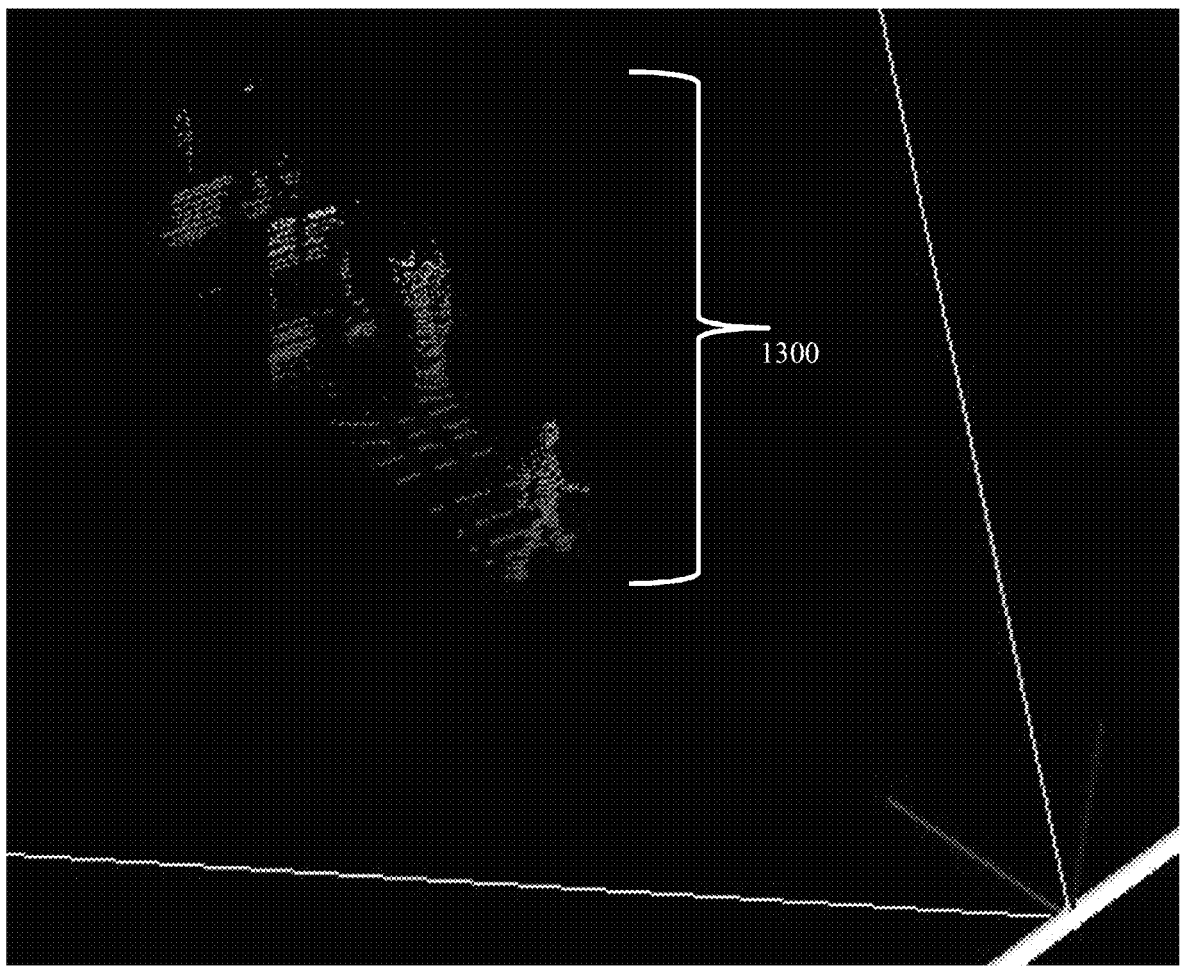
FIG. 13 shows a non-limiting example perspective image of the frustum of data within the LiDAR point cloud.

In some embodiments, a frustum process is used for extracting a three-dimensional frustum from the depth data corresponding to the attention region. A non-limiting exemplary three-dimensional frustum is shown in FIG. 13.

In some embodiments, once the attention region containing the object of interest is generated, the depth of the object of interested must be determined to localize the object of interest in 3D space. Although many current methods directly regress a scalar depth value directly from the three-dimensional depth data using a convolutional neural network (CNN), regression a single depth value is very challenging because such three-dimensional depth data only comprises surface distances, because the depth of the object of interest can vary widely, and because occluding points and clutters distract such depth estimation. Alternative methods that estimate depth using only points within the 2D mask region are prone to error when processing sharply segmenting occlusions and separate elements within a background, as far-away points projected onto a two-dimensional image appear close together.

Figure 8:
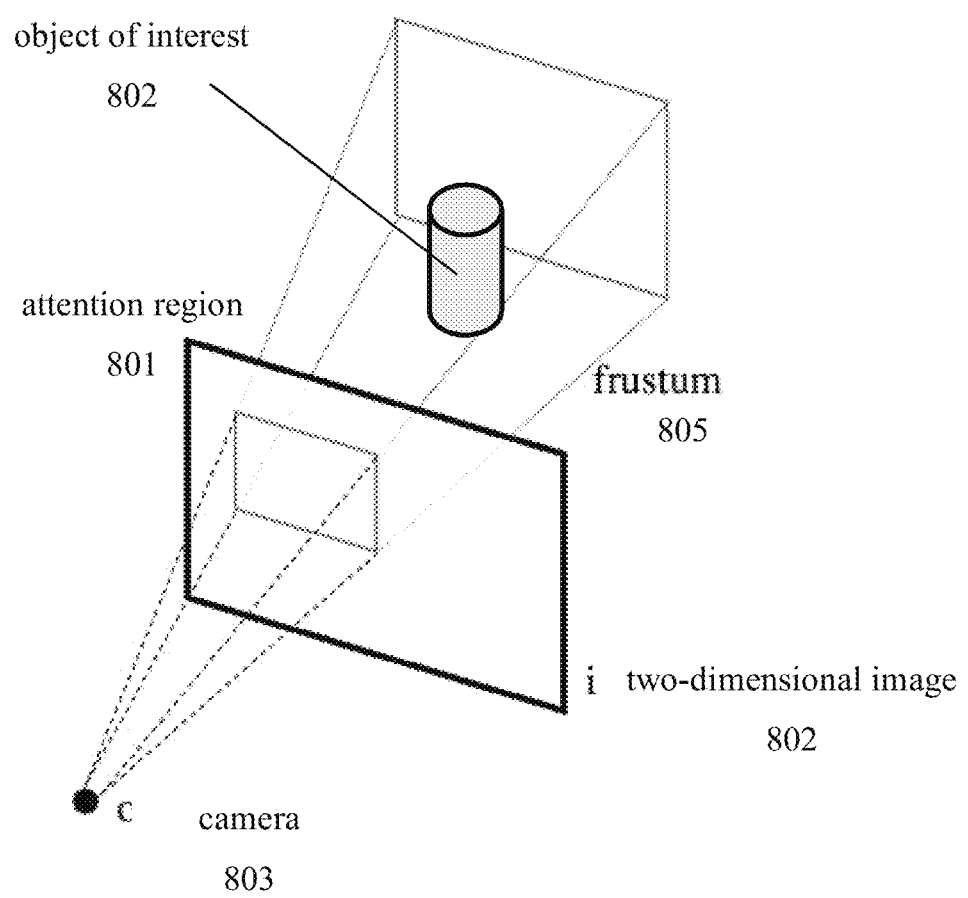
FIG. 8 shows a non-limiting schematic diagram of the generation of a frustum from an attention region.

FIG. 8 shows a non-limiting schematic diagram of a step in the frustum process, wherein the frustum 805 is generated by projecting the attention region 801, which encompasses the object of interest 804 within the two-dimensional image 802, from the plane of the two dimensional image 802 away from the point of the camera 803.

In some embodiments, extracting a three-dimensional frustum from the three-dimensional depth data using the attention region comprises aligning the frustums captured from a plurality of perspectives by rotating the depth data in each frustum by a yaw angle associated with each perspective. In some embodiments, the yaw angle is calculated using the position of the center pixel in the attention region. In some embodiments, aligning the frustums reduces the distribution space of the frustum point cloud, which improves segmentation performance.

Figure 14:
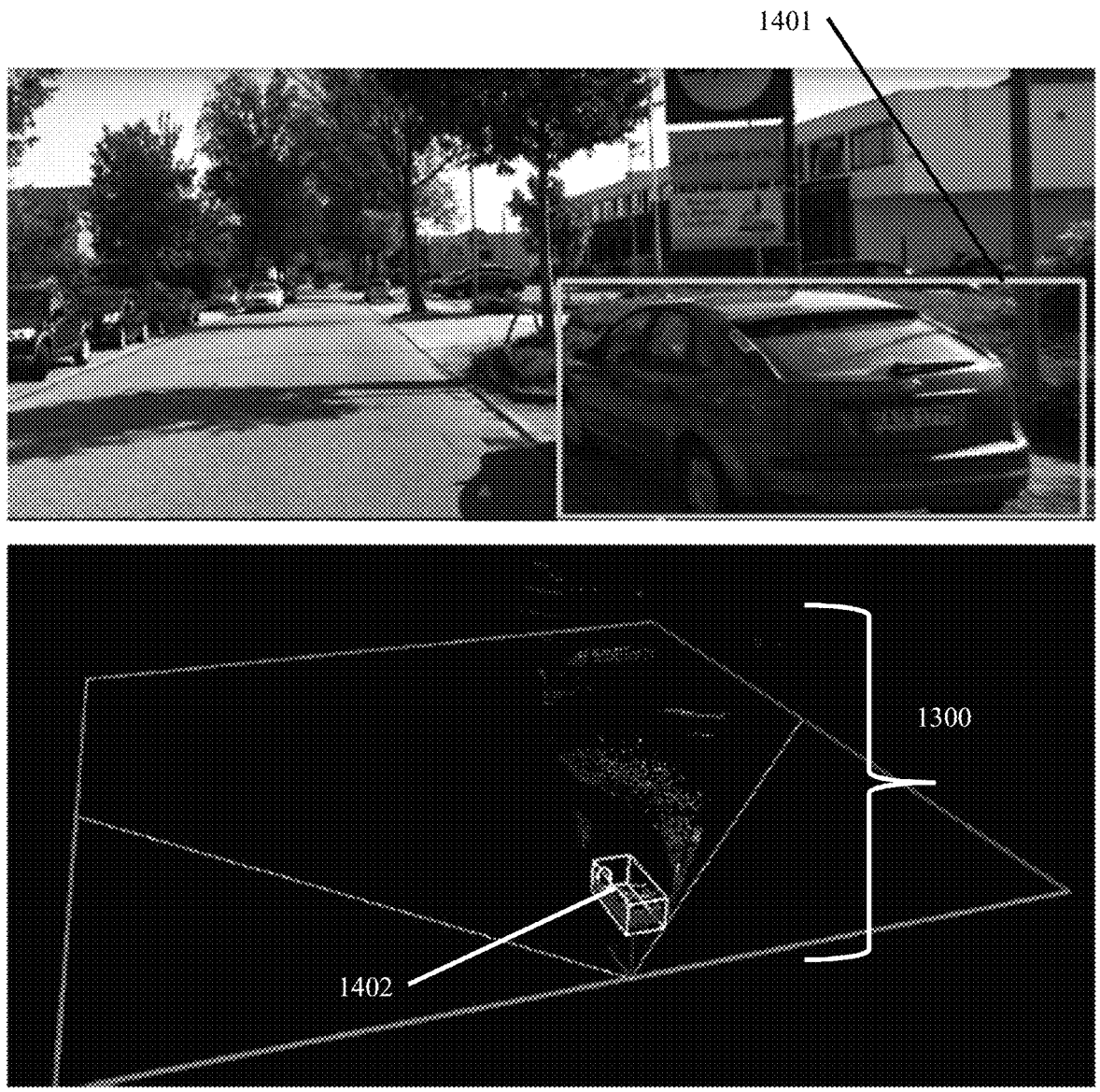
FIG. 14 shows a non-limiting example of a two-dimensional image, the attention region, and the three-dimensional boundary of the object of interest.
Figure 15:
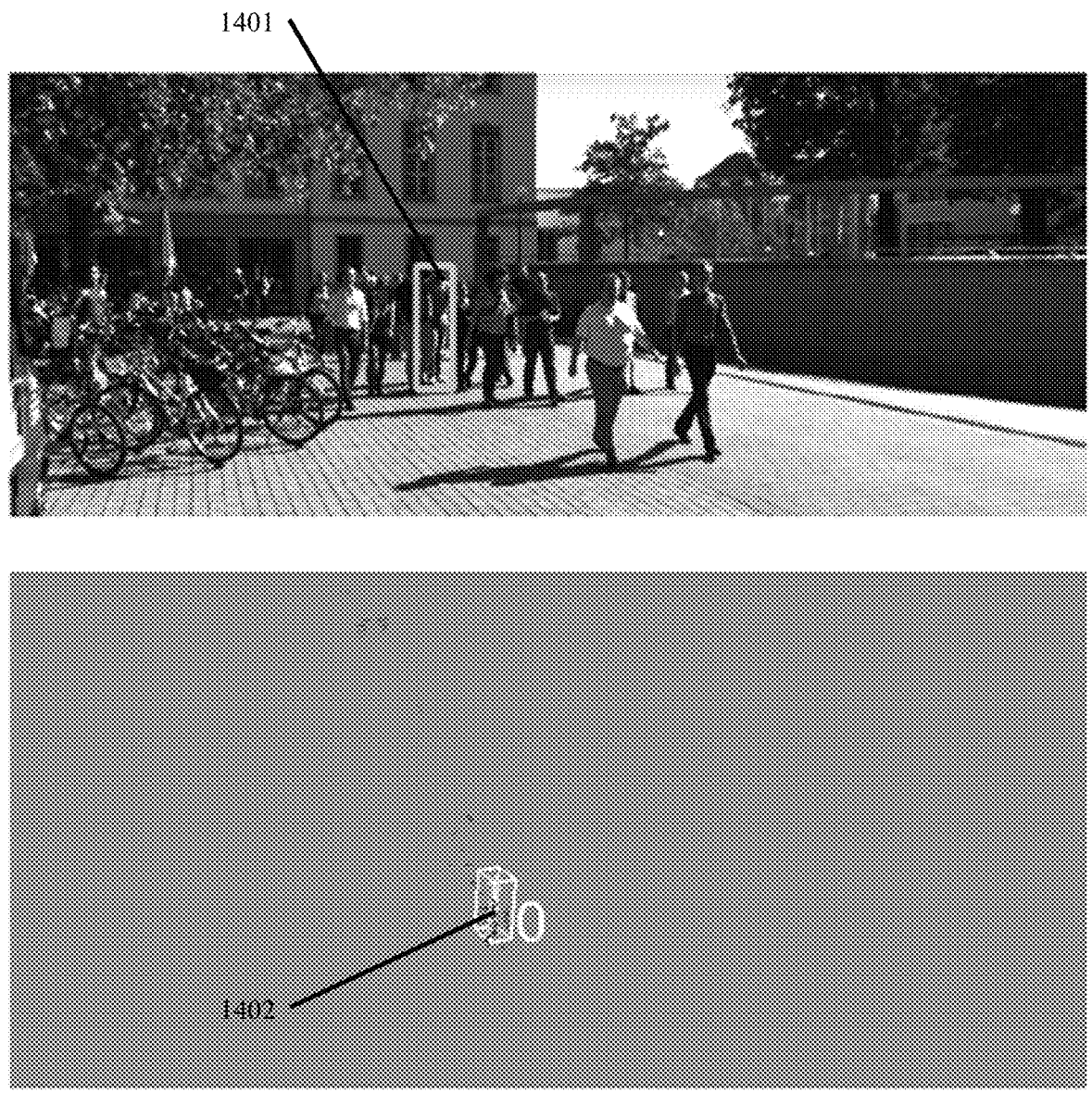
FIG. 15 shows a non-limiting first example of a two-dimensional image, the attention region, the frustum, and the three-dimensional boundary of the object of interest.
Figure 16:
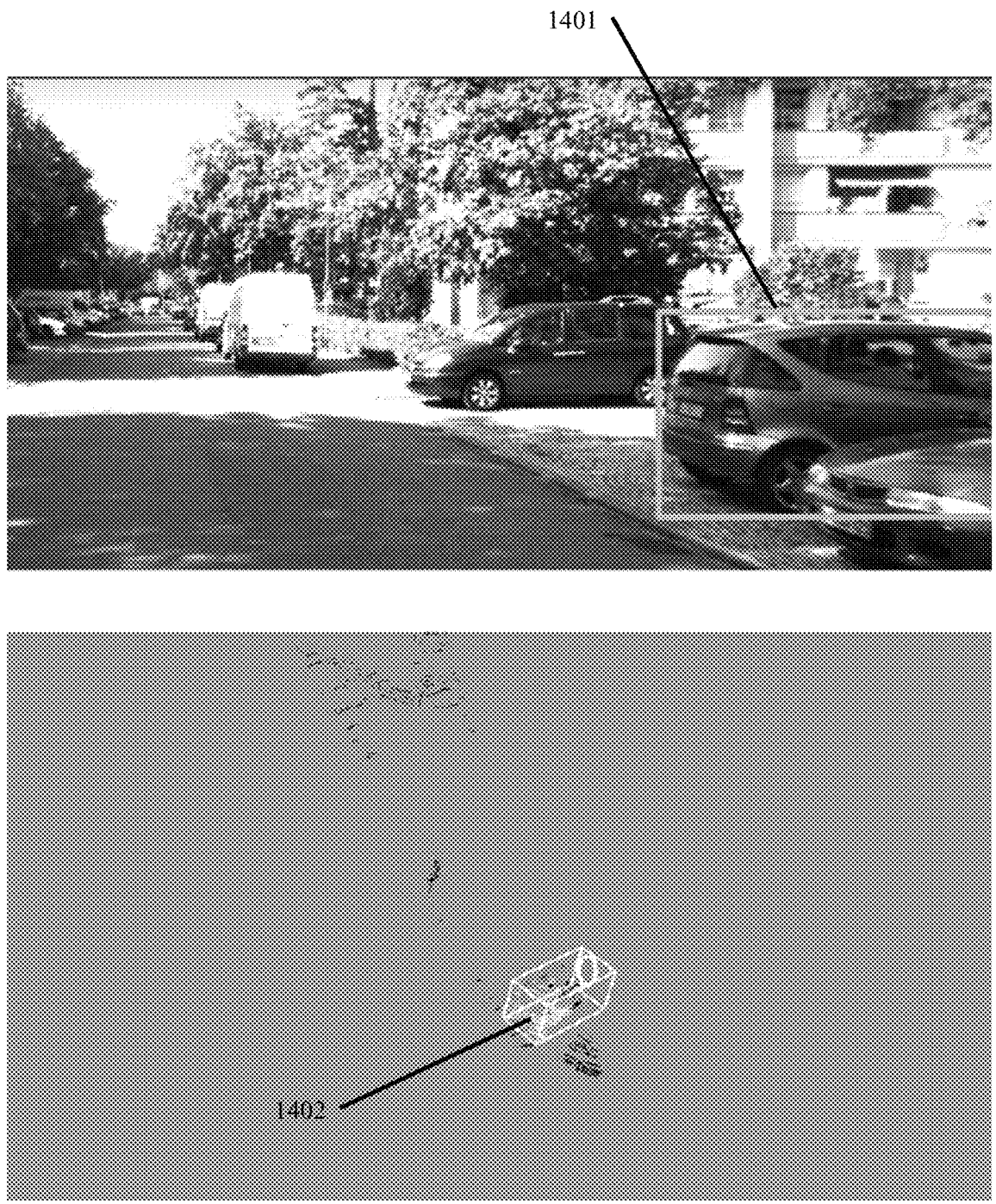
FIG. 16 shows a non-limiting second example of a two-dimensional image, the attention region, and the three-dimensional boundary of the object of interest.
Figure 17:
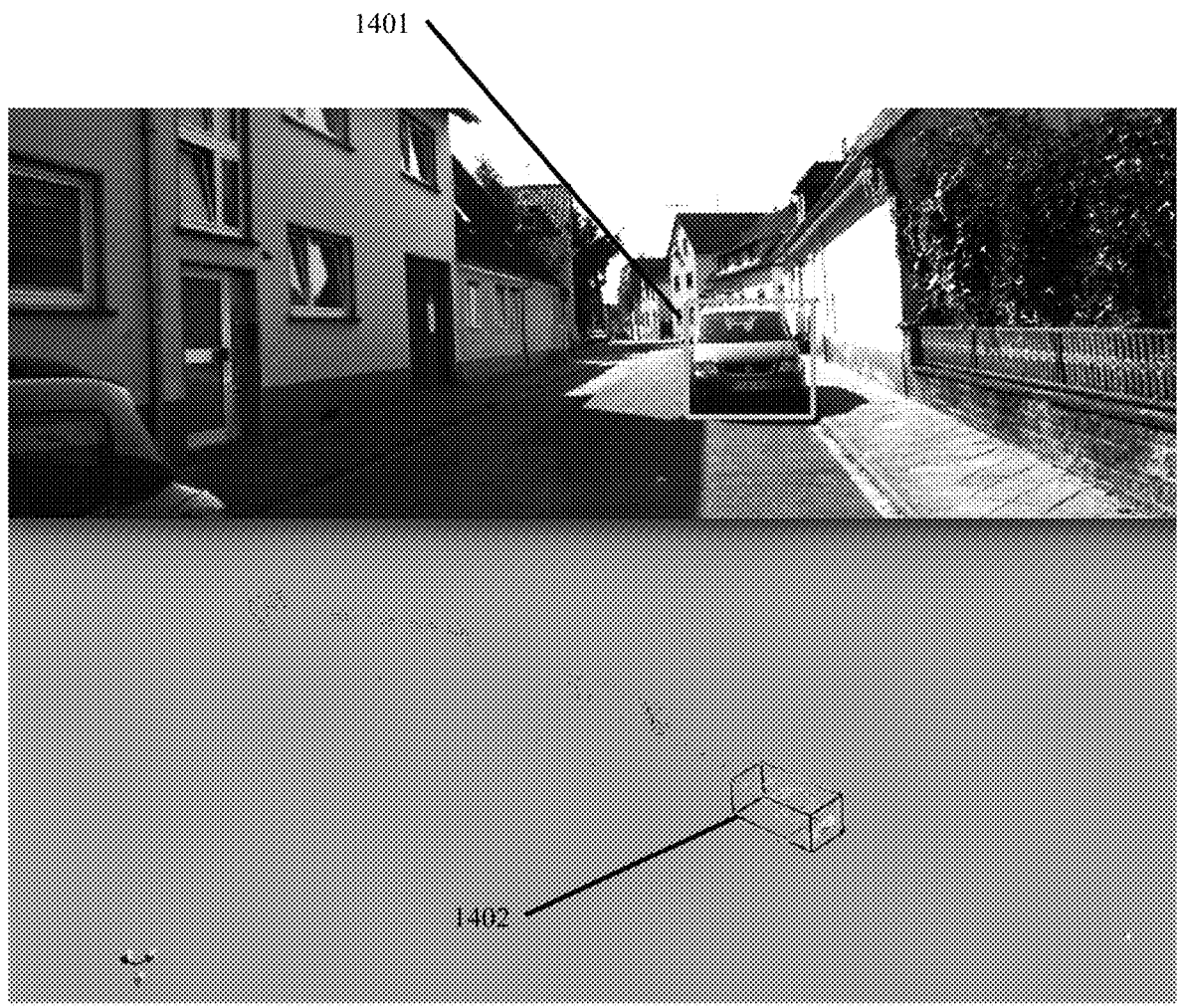
FIG. 17 shows a non-limiting first example of a two-dimensional image, the attention region, the three-dimensional boundary of the object of interest, and the object center regression.
Figure 18:
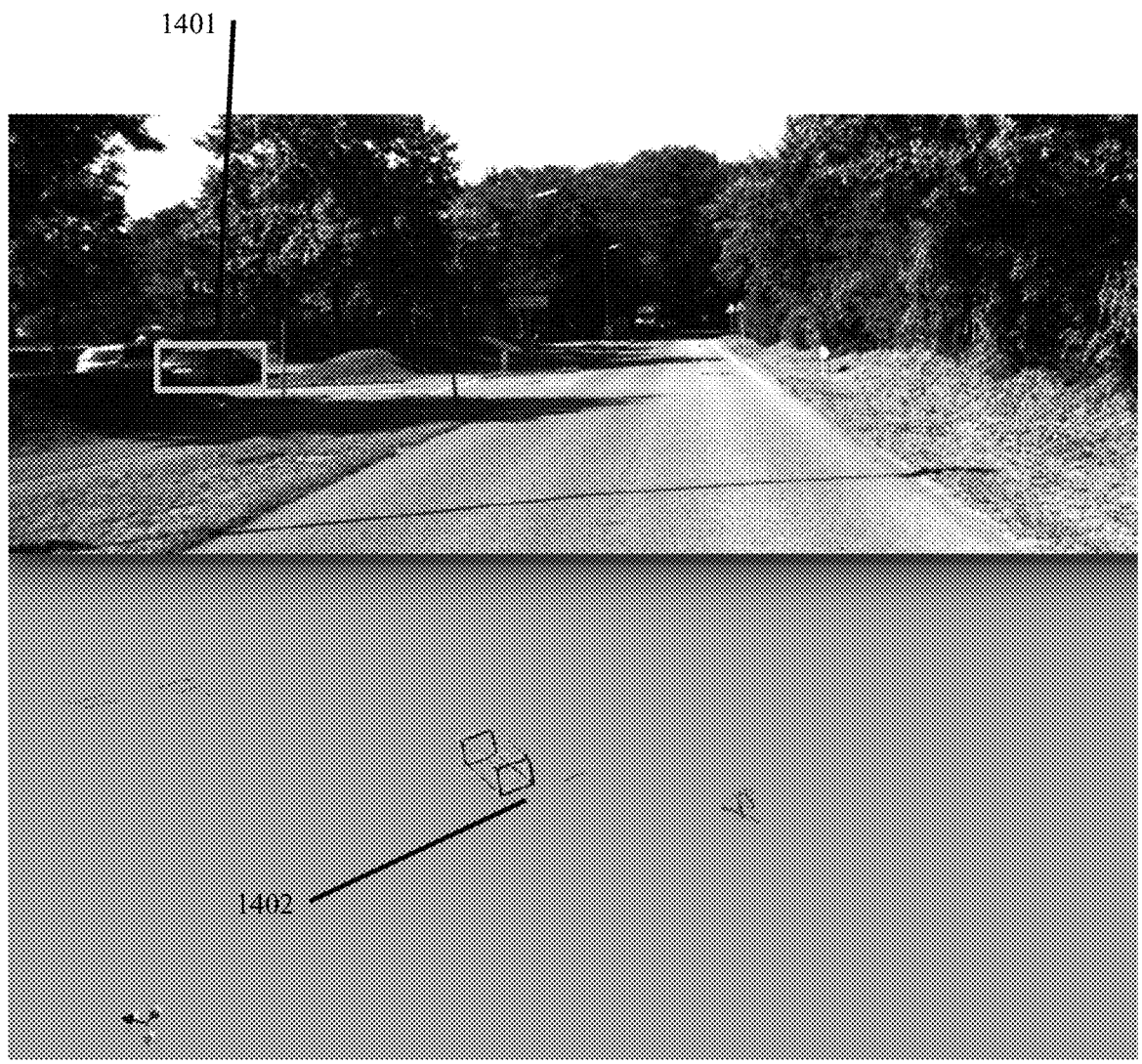
FIG. 18 shows a non-limiting second example of a two-dimensional image, the attention region, the three-dimensional boundary of the object of interest, and the object center regression.
Figure 19:
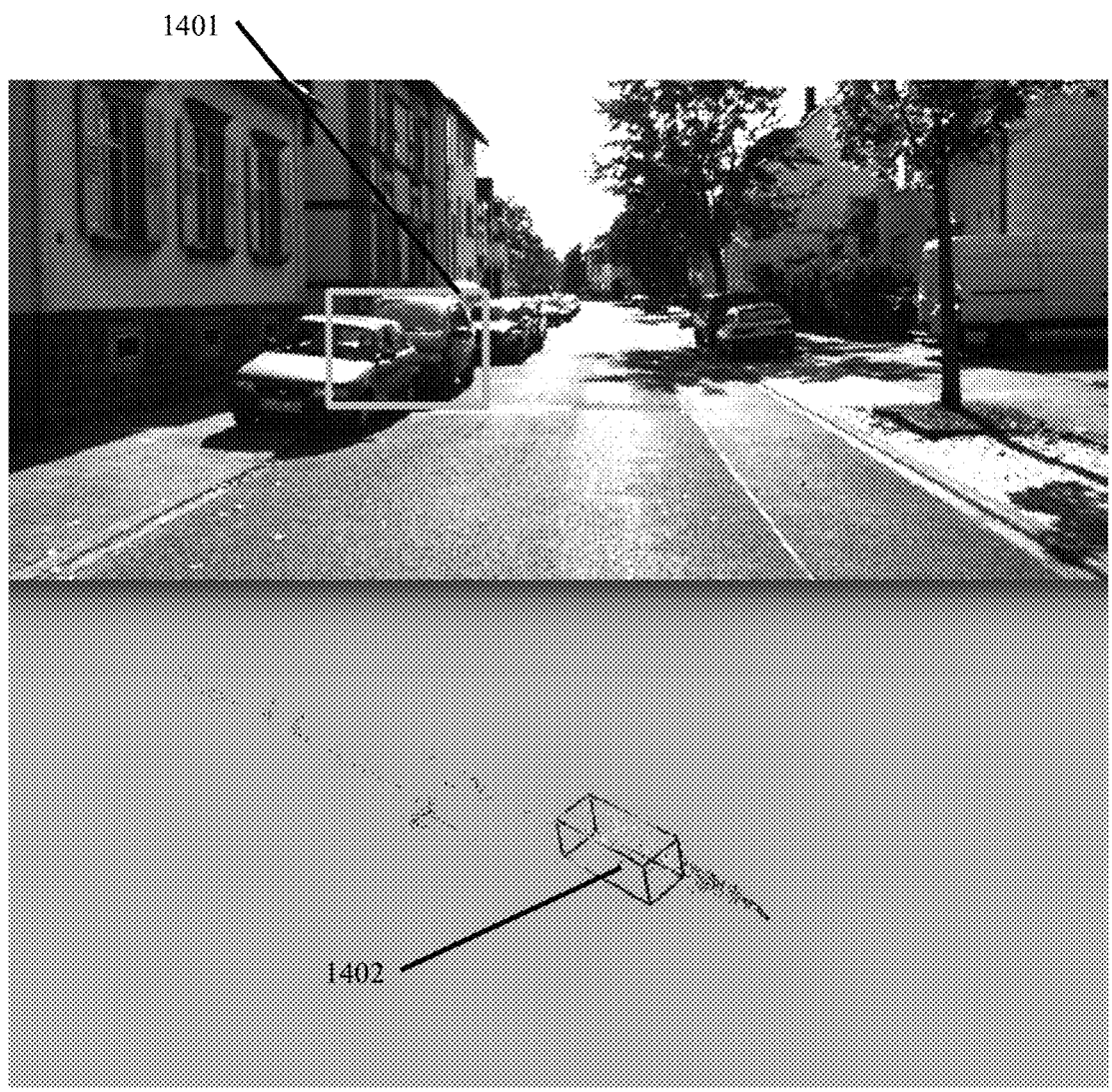
FIG. 19 shows a non-limiting third example of a two-dimensional image, the attention region, the three-dimensional boundary of the object of interest, and the object center regression.

Non-limiting examples of frustums 1300 generated by the frustum process are shown in FIGS. 13 and 14.

Boundary Process

Figure 9:
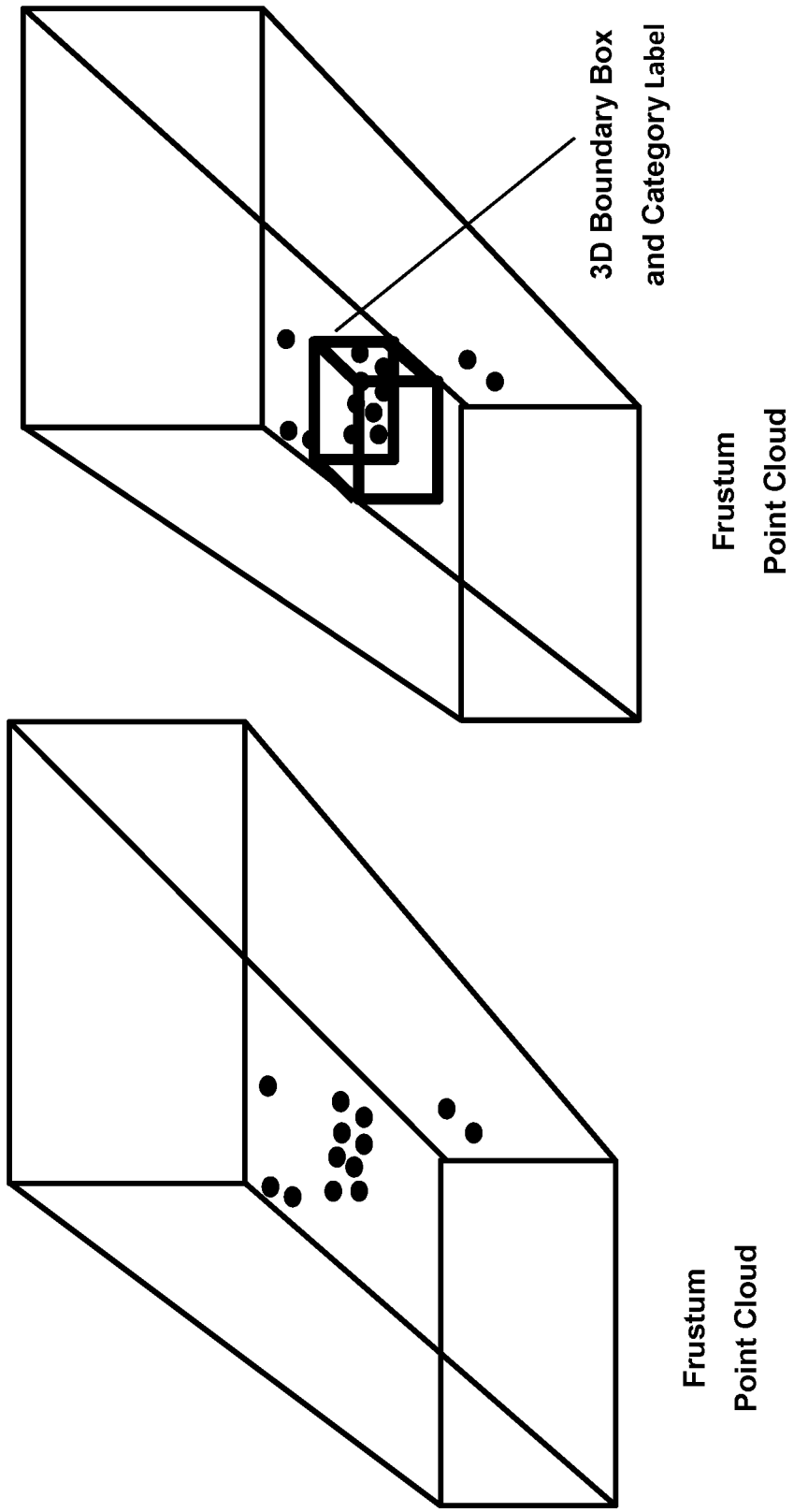
FIG. 9 shows a non-limiting schematic diagram of the generation of a three-dimensional boundary of an object of interest from the frustum.

In some embodiments, per FIG. 9, the boundary process generates an oriented three-dimensional boundary for the object of interest from a frustum point cloud. In some embodiments, the boundary process comprises point cloud normalization, a two-stage center regression, three-dimensional boundary parameterization, and an estimation of specialized losses. In some embodiments, smoothed L1 (Huber) loss is used for regression.

Figure 7:
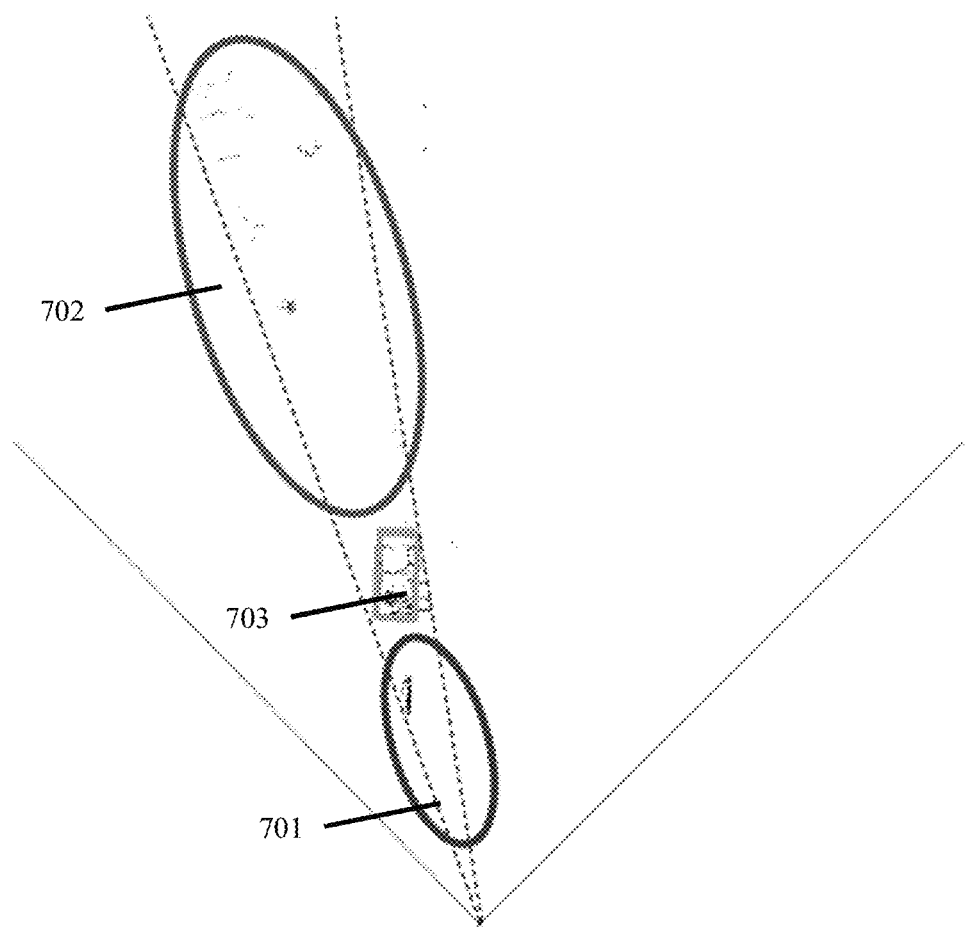
FIG. 7 shows a non-limiting schematic diagram of a bird's eye view of three dimensional depth data within a frustum.

In some embodiments, the boundary process receives a point cloud frustum and optionally a semantic class determined by the regioning process. In some embodiments, the boundary process generates and regresses an oriented three-dimensional boundary for the object of interest. In some embodiments, per FIG. 7, generating and regressing an oriented three-dimensional boundary for the object of interest 703 comprises ignoring foreground occlusion three-dimensional depth data 701, and background clutter three-dimensional depth data 702.

In some embodiments, the boundary process is based on the PointNet architecture, wherein each three-dimensional depth data point within the frustum is individually projected into a higher embedding space by a shared Multilayer Perceptron (MLP), and aggregated by a symmetric function, such as max pooling. Some embodiments further comprise, implementing another MLP for final binary classification. In some embodiments, the semantic class is encoded as a one-hot vector and is used as additional point features along with XYZ, intensity.

Figure 4:
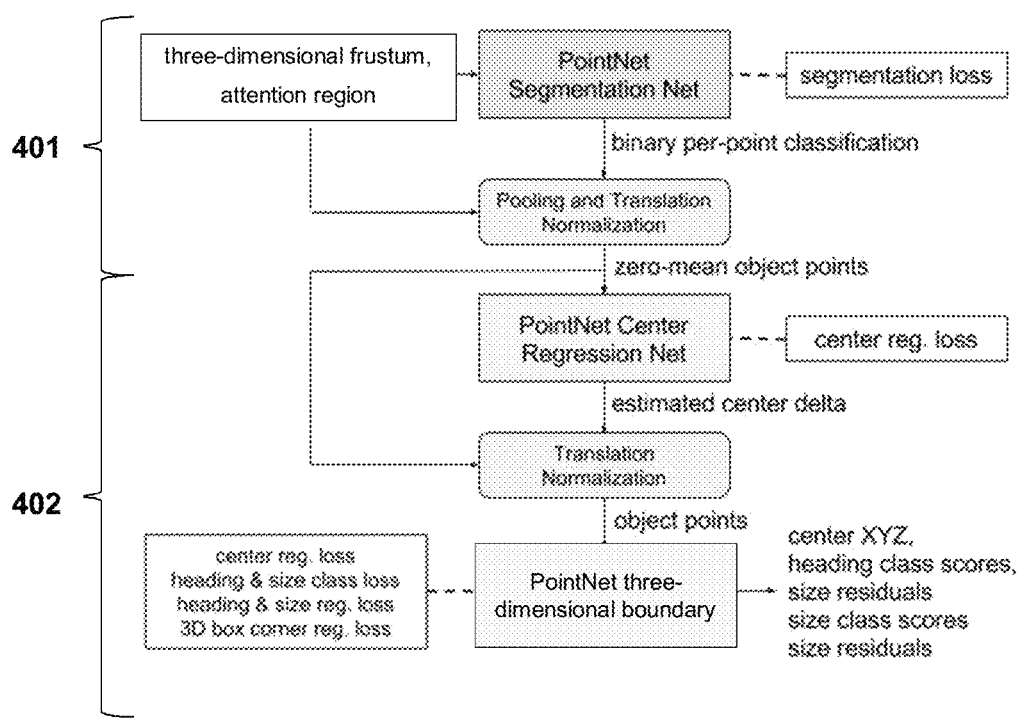
FIG. 4 shows a non-limiting flowchart of a boundary process.

A non-limiting flowchart of the boundary process is shown in FIG. 4. In some embodiments, the boundary process comprises a primary boundary process 401 and a secondary boundary process 402 for spatial translation, and three dimensional boundary generation, respectively. In some embodiments, the primary and secondary boundary processes 401, 402 are trained end-to-end. In some embodiments, the primary and secondary boundary processes 401, 402 are trained together with the frustum process.

In some embodiments, the primary 401 boundary process first determines the centroid of the complete object of interest. In some embodiments, the primary 401 boundary process then translates the three-dimensional depth data associated with each object in the point cloud to a local coordinate system whose origin is at the centroid of the object. In some embodiments, the coordinate system translation is recorded to enable reversion to the previous coordinate system once the three-dimensional boundary box is determined. In some embodiments, coordinate translation increases the locational similarity between three-dimensional depth data points associated with the object of interest, to support more weight sharing in the classifying process. In some embodiments, the primary boundary process 401 translates the three-dimensional depth data associated with each object of interest without scaling the three-dimensional depth data, to preserve three-dimensional depth data collected from various viewpoints. In some embodiments, the primary boundary process 401 is supervised.

In some embodiments, the primary boundary process 401 determines an oriented three-dimensional boundary from the three-dimensional depth data. In some embodiments, the oriented three-dimensional boundary is amodal; comprising a minimum three-dimensional boundary for the whole object of interest whole object even if part of the object are occluded or truncated. In some embodiments, the oriented three-dimensional boundary is cuboid and defined by the coordinates of its 8 corners. In some embodiments, the oriented three-dimensional boundary is assumed to exhibit only one degree of rotation freedom (along the up-axis) such that the oriented three-dimensional boundary can be defined by a center point (XYZ), a size (height, width, length) and a heading angle ($\theta$).

Figure 10:
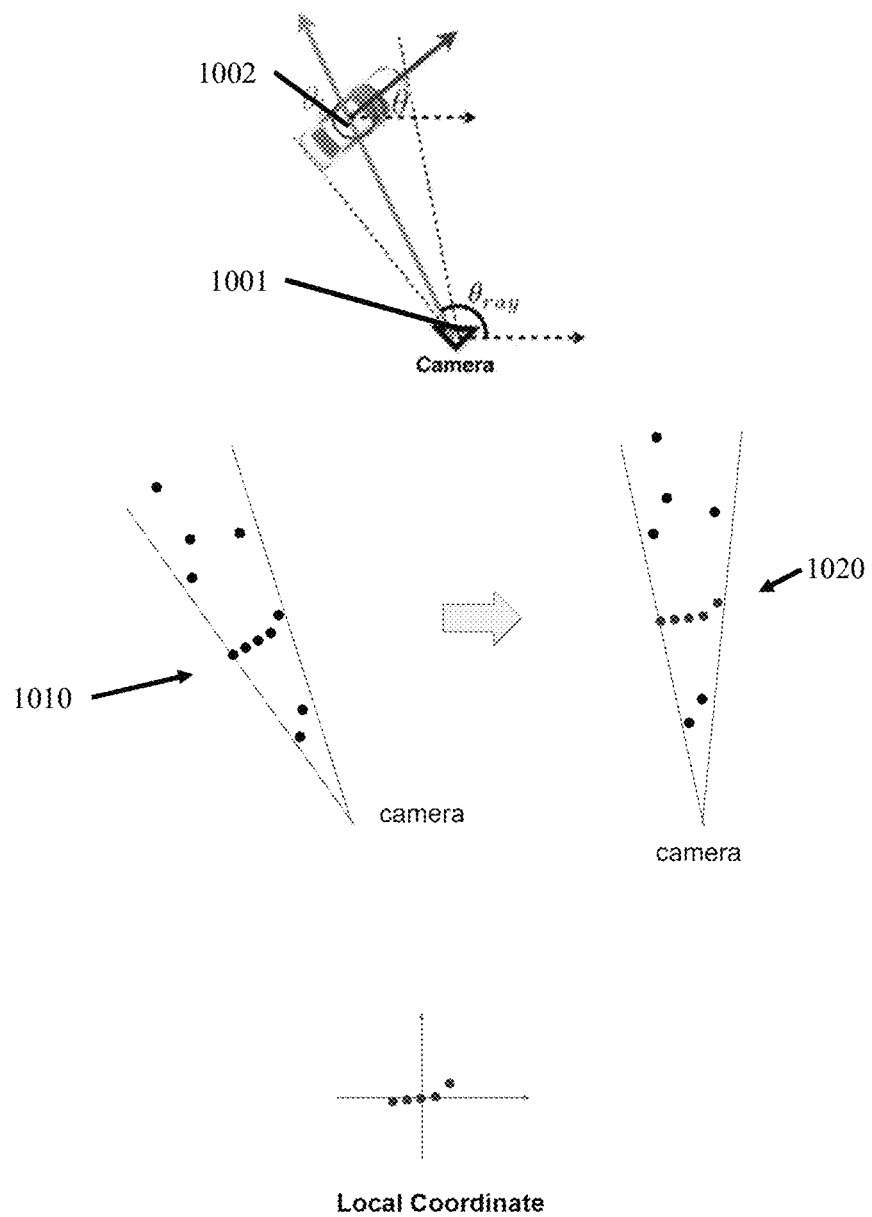
FIG. 10 shows a first non-limiting schematic diagram of coordinate normalization.
Figure 11:
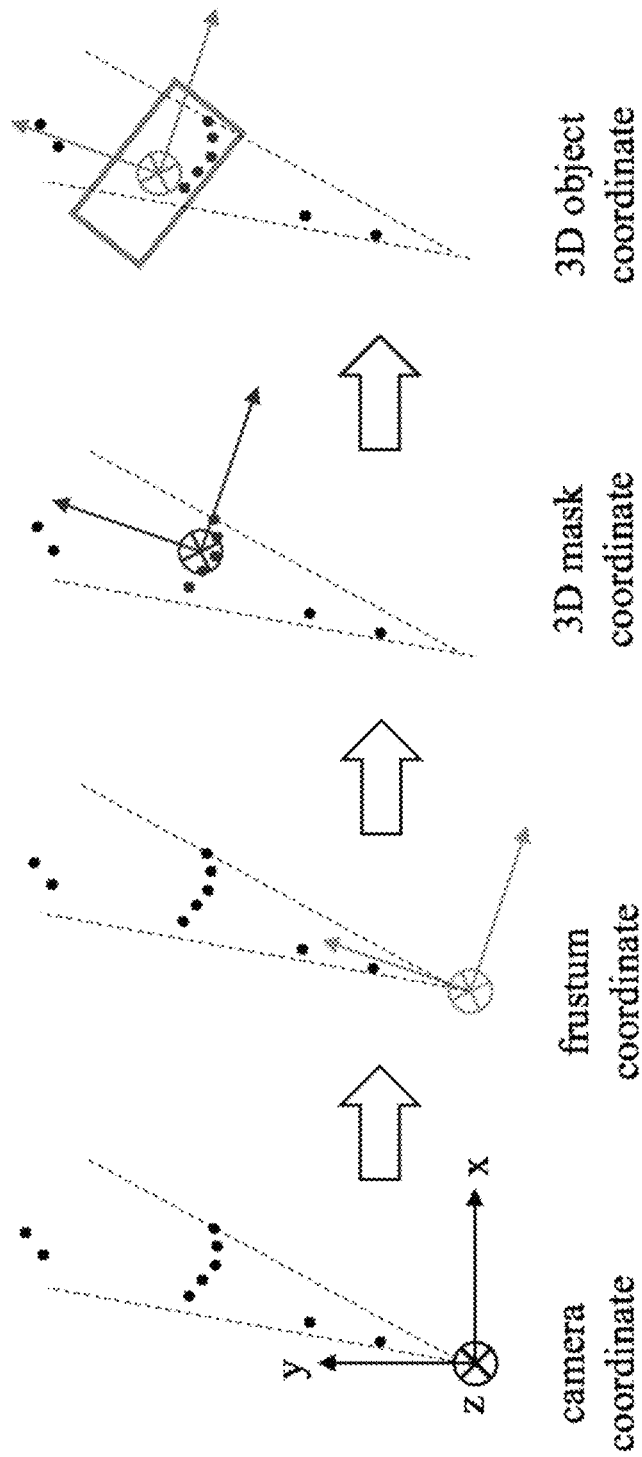
FIG. 11 shows a second non-limiting schematic diagram of coordinate normalization.

A non-limiting schematic diagram of coordinate normalization is shown in FIGS. 10 and 11, wherein a camera 1001 at an origin captures three-dimensional depth data 1010 of an automobile 1002 with a heading angle ($\theta$), whose centroid is located at an orientation angle ($\theta 1$). In these embodiments, the three-dimensional depth data 1010 is then rotated about the origin by the orientation angle ($\theta 1$), an object of interest three-dimensional depth data 1020 is determined, and the object of interest three-dimensional depth data 1020 is translated so that the centroid of the object of interest three-dimensional depth data 1020 is at the origin.

Figure 20:
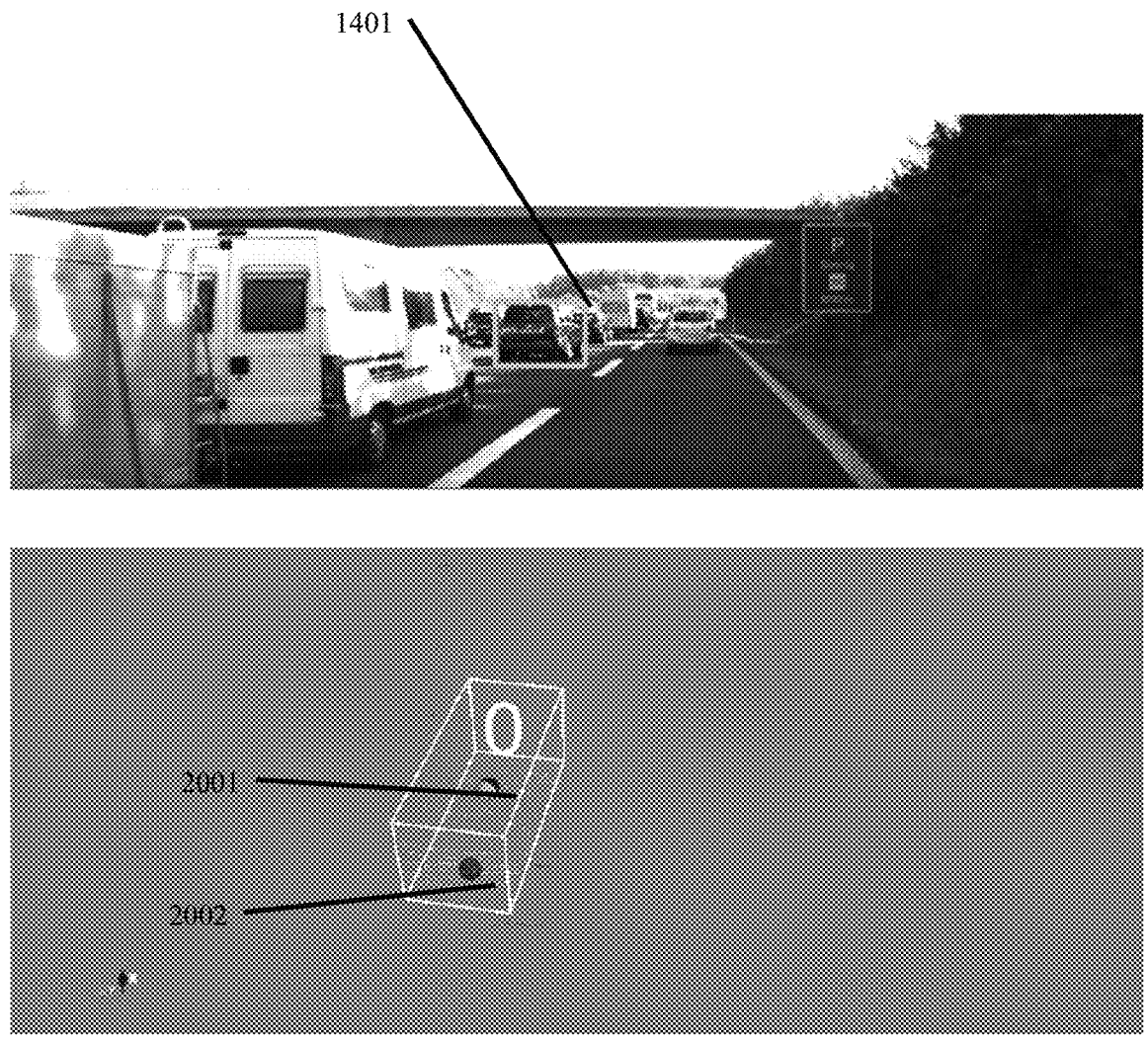
FIG. 20 shows a non-limiting first example of a two-dimensional image, the attention region, the three-dimensional boundary of the object of interest, the object centroid, and the object 3D mask median.
Figure 21:
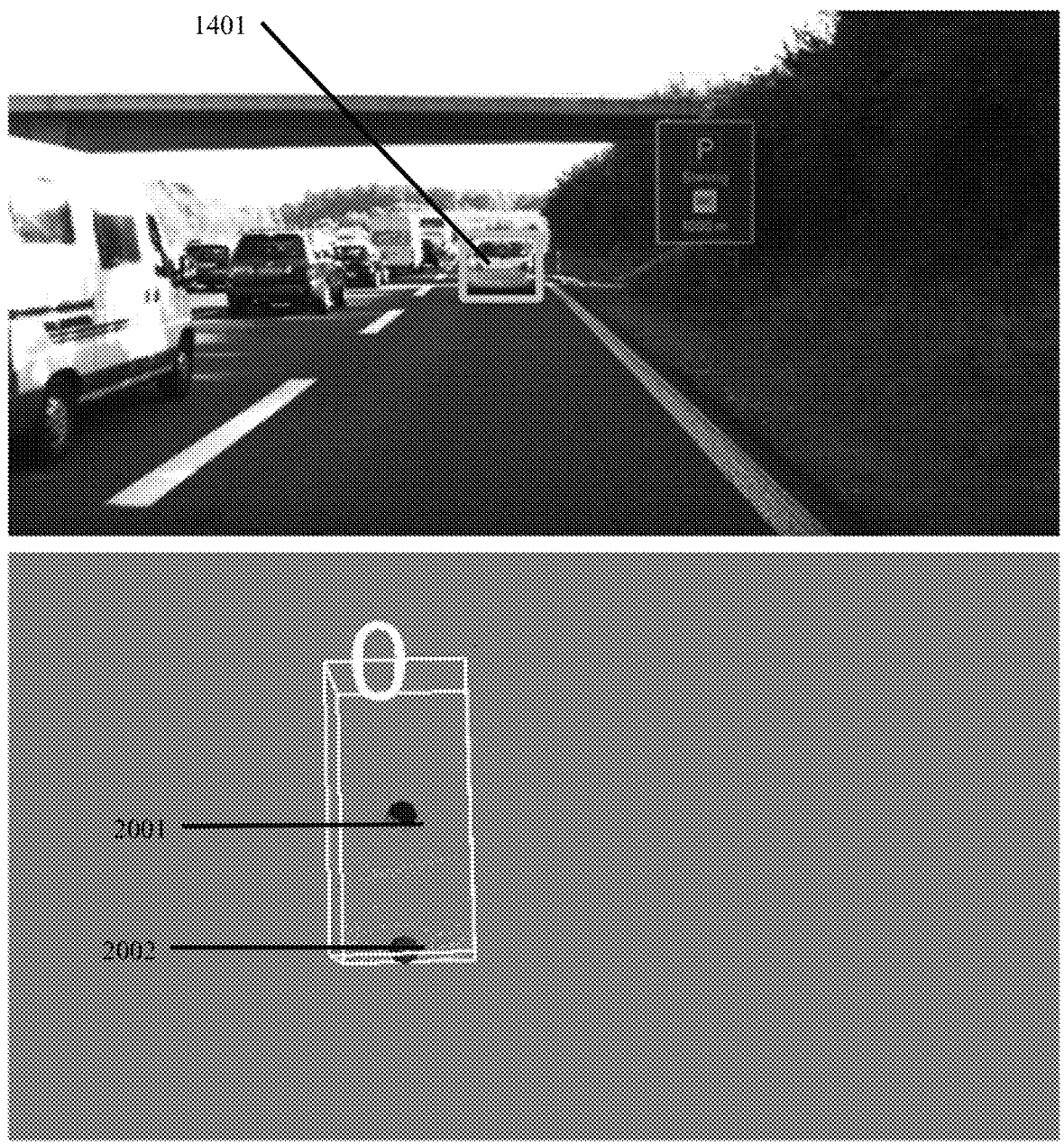
FIG. 21 shows a non-limiting second example of a two-dimensional image, the attention region, the three-dimensional boundary of the object of interest, the object centroid, and the object 3D mask median.

Non-limiting examples of origin 2001 calculation are shown in FIGS. 20 and 21, wherein a line between the origin 2001 and a 3D mask median 2002 defines the heading of the three-dimensional boundary for the object of interest.

In some embodiments, regressing the oriented three-dimensional boundary for the object of interest comprises regressing to a center residual, comprising estimating a residual to the residual. In some embodiments estimating a residual to the residual comprises determining a vector from the local coordinate system's origin to the real center in the same coordinate.

In some embodiments, the size of the three-dimensional boundary for the object of interest is determined by clustering the three-dimensional depth data points associated with the object of interest into M number of clusters and determining classification scores and residual regression values for each cluster. In some embodiments, each cluster represents a category. In some embodiments, each of the clusters has a typical size. In some embodiments, the size residual is normalized once for each cluster.

In some embodiments, the size of the three-dimensional boundary for the object of interest is determined by splitting the orientations into K number of bins, and predicting classification scores and normalized residual regression values for each bin. In some embodiments, the boundary process produces three center regression numbers, M+3 M size estimation values, and K+K heading estimation values. In some embodiments, the boundary process produces in total 3+4M+3K values.

In some embodiments, the boundary process calculates the three-dimensional boundary for the object of interest based on the center regression numbers, the size estimation values, the heading estimation values, and ground-truth boundary parameters. In some embodiments, the boundary process is supervised with a weighted sum of classification and regression losses, as well as an extra regularization loss. In some embodiments, heading class and size class with the largest scores are selected at inference. In some embodiments, the three-dimensional boundary for the object of interest is computed from the class prediction and residual estimations.

$$L(\theta) = L_{mask\text{-}seg} + L_{C\text{-}huber} + L_{h\text{-}softmax} + L_{h\text{-}huber} + L_{s\text{-}softmax} + L_{h\text{-}huber} + \gamma L_{corner}$$

Some embodiments further comprise a corner regression loss based on a smooth $l_1$ distance between the three-dimensional boundary of the object of interest and a ground-truth three-dimensional boundary corners wherein:

$$L_{corner} = \sum_{i=1}^{NS} \sum_{j=1}^{NH} \delta_{ij} \min\left\{ \sum_{k=1}^{8} \|P_k^{ij} - P_k^*\|, \sum_{i=1}^{8} \|P_k^{ij} - P_k^*\| \right\}$$

In some embodiments, due to the ambiguity of flipping orientations, the predicted corner loss distance to the three-dimensional boundary for the object of interest with a flipped ground-truth box is also calculated, wherein the corner loss is the minimum of the two corner loss calculations.

In some embodiments, the corner distance is calculated by a process comprising: combining the bin center heading of the heading candidates in each bin, for K number of headings, with the residual heading estimation, generating the corner coordinates of the three-dimensional boundary for the object of interest for all headings and each of the clusters of M sizes from the centroid as a K×M×8×3 array, constructing a two dimensional K×M mask matrix S wherein $S_{ij}=1$ if i and j correspond to the heading and size class with the highest scores, and wherein $S_{ij}=0$ for all other values of i and j, extracting the three-dimensional positions of the 8 corners as an 8×3 boundary array using batch matrix multiplication, and computing corner loss by comparing the boundary array with a ground-truth boundary array.

Some embodiments further comprise extracting the three-dimensional depth data in each frustum that are classified as the object of interest. Some embodiments further comprise inserting the three-dimensional depth data classified as the object of interest into a classifying process for final estimation of the three-dimensional boundary for the object of interest.

Non-limiting examples of three-dimensional boundaries for an object of interest 1002 generated by the boundary process are shown in FIGS. 10-15

Classifying Process

Figure 5:
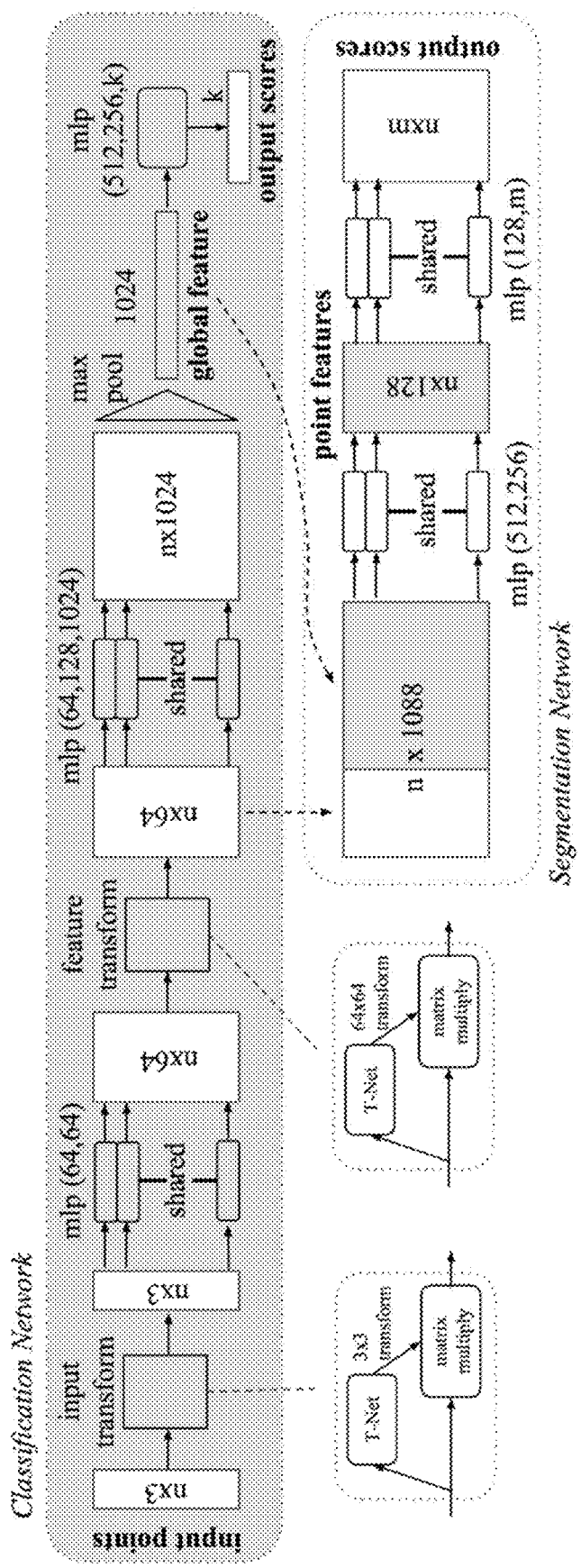
FIG. 5 shows a non-limiting flowchart of a classifying process.

In some embodiments, a classifying process is used for classifying the object of interest based on a combination of features from the attention region of the two-dimensional image data and the three-dimensional depth data within and around the regressed boundary, and classifies the object of interest based on a combination of features from the attention region of the two-dimensional image data and the three-dimensional depth data within and around the regressed boundary. In some embodiments, a soft-max loss is employed for classification. FIG. 5 shows a non-limiting flowchart of a classifying process.

Figure 6:
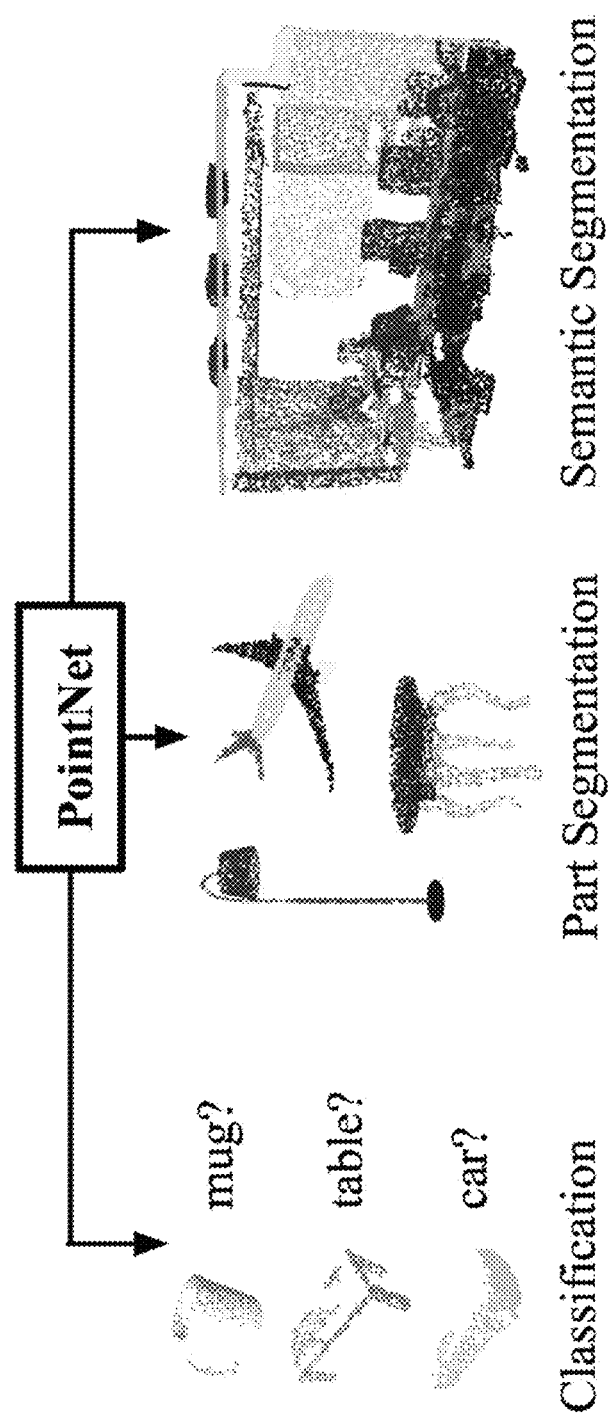
FIG. 6 shows a non-limiting schematic diagram of deep learning classification, part segmentation, and semantic segmentation modules.

FIG. 6 shows a non-limiting schematic diagram of deep learning classification, part segmentation, and semantic segmentation modules. In some embodiments, classification comprises determining what is the type or class of the object of interest. In some embodiments, part segmentation comprises determining and differentiating between multiple segments or components in an object of interest. In some embodiments, semantic segmentation comprises determining regions that represent objects with different classifications. In some embodiments, semantic segmentation further comprises accounting for occlusion cause by two or more objects. Is some embodiments, the classification comprises an object classification and a clutter classification, wherein the clutter classification refers to three dimensional depth data of non-relevant regions, which include such objects as ground or vegetation, and occluding objects.

Autonomous Robotic Systems

A second aspect provided herein is an autonomous robotic system comprising: an optical camera, a depth sensor, a memory, and at least one processor configured to: receive two-dimensional image data from the optical camera; generate an attention region in the two-dimensional image data, the attention region marking an object of interest; receive three-dimensional depth data from the depth sensor, the depth data corresponding to the image data; extract a three-dimensional frustum from the depth data corresponding to the attention region; apply a deep learning model to the frustum to: generate and regress an oriented three-dimensional boundary for the object of interest; and classify the object of interest based on a combination of features from the attention region of the two-dimensional image data and the three-dimensional depth data within and around the regressed boundary.

In some embodiments, the autonomous robotic system is an autonomous vehicle. In some embodiments, the two-dimensional image data is RGB image data. In some embodiments, the two-dimensional image data is IR image data. In some embodiments, the depth sensor comprises a LiDAR. In some embodiments, the three-dimensional depth data comprises a sparse point cloud. In some embodiments, the depth sensor comprises a stereo camera or a time-of-flight sensor. In some embodiments, the three-dimensional depth data comprises a dense depth map. In some embodiments, the deep learning model comprises a PointNet. In some embodiments, the deep learning model comprises a three-dimensional convolutional neural network on voxelized volumetric grids of the point cloud in frustum. In some embodiments, the deep learning model comprises a two-dimensional convolutional neural network on bird's eye view projection of the point cloud in frustum. In some embodiments, the deep learning model comprises a recurrent neural network on the sequence of the three-dimensional points from close to distant. In some embodiments, the classifying comprises semantic classification to apply a category label to the object of interest.

Figure 22:
FIG. 22 shows a non-limiting example of a two-dimensional image, multiple attention regions, and multiple three-dimensional boundaries of objects of interest.

FIG. 22 shows a non-limiting example of a two-dimensional image, multiple attention regions, and multiple three-dimensional boundaries of objects of interest for the navigation of an autonomous vehicle.

Method Performance

KITTI is a dataset used for machine-learning research that serves high-quality software training material. The KITTI dataset represents data related to captured images of various areas using cameras and laser scanners by autonomous vehicles driving through a mid-size city.

Figure 23:
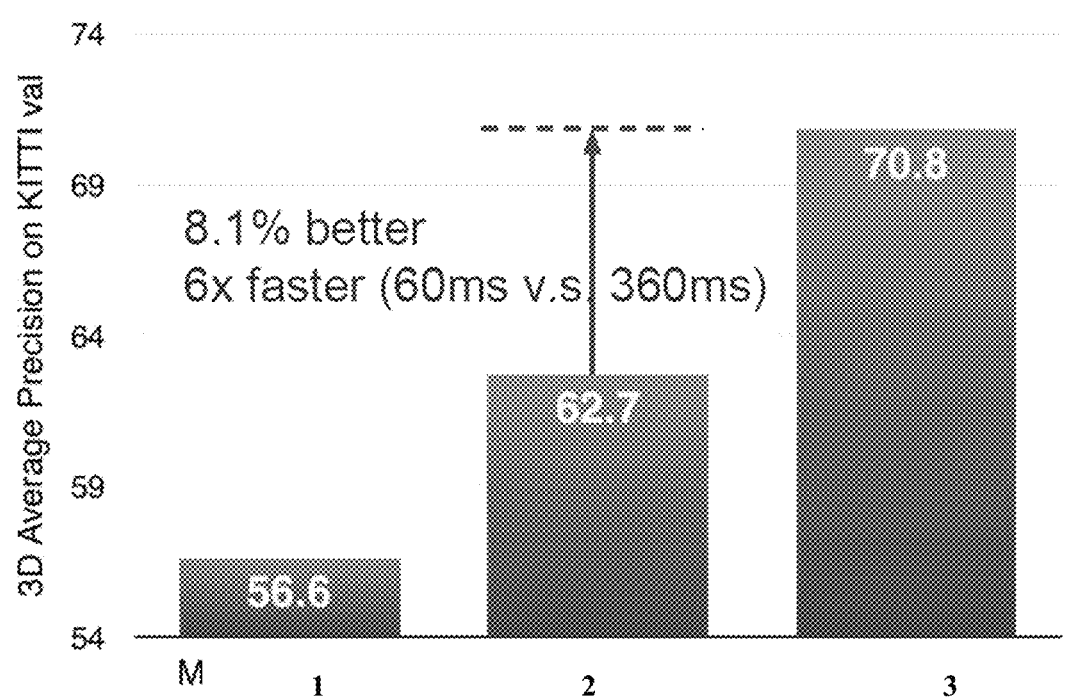
FIG. 23 shows a non-limiting graph of KITTI 3D object detection benchmark results.
Figure 24:
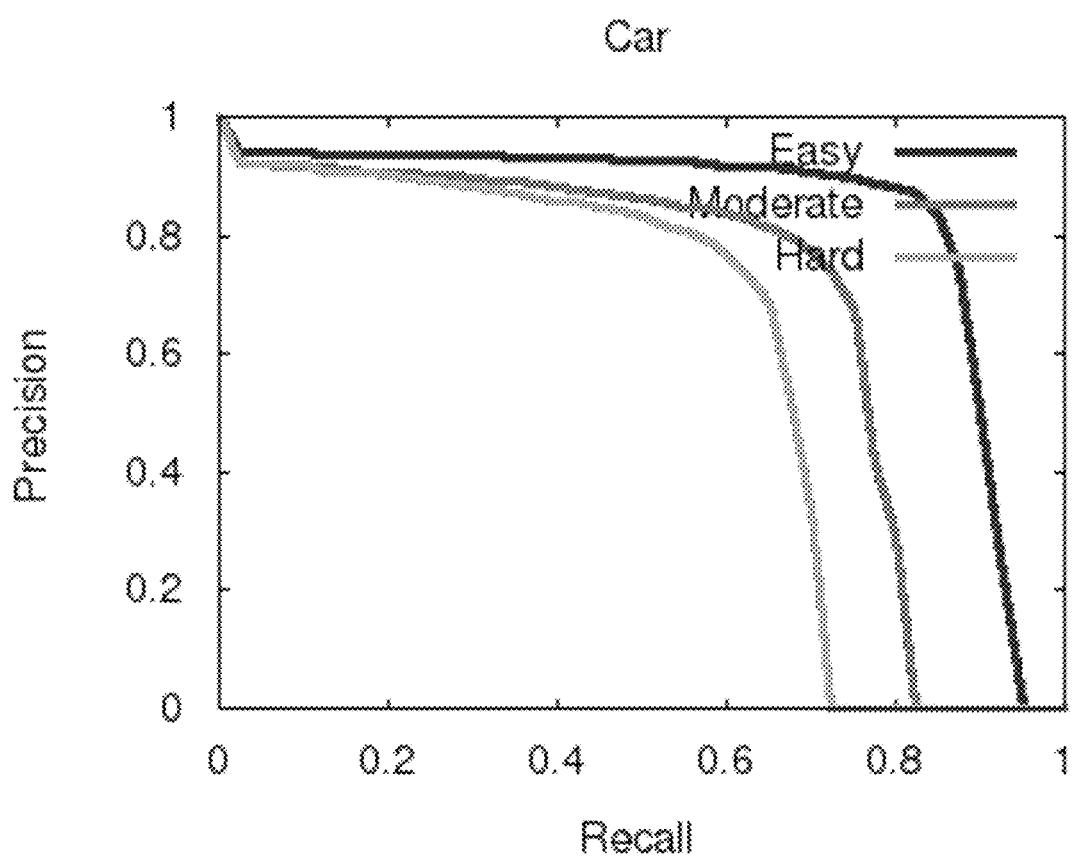
FIG. 24 shows a non-limiting graph of easy, moderate, and hard three-dimensional boundary corner loss.

FIG. 23 shows exemplary 3D object detection KITTI benchmark results for three different detection methods, wherein the third detection method taught herein exhibited a 3D average KITTI precision value of 70.8, an improvement of 8.1 percent over prior methods one and two. Further a calculation speed of 60 milliseconds was recorded for the completion of a method described herein, which is about 6 times faster than the current methods 1 (MV3D) and 2 (MV3D+RGB). Table 1 shows the results of point cloud segmentation, wherein Cam 1, 2, 3, and 7 represent different camera perspectives.

Finally, the methods of the current disclosure are about 20 times to 9000 times faster than those methods in comparison on SUN-RGBD.

Digital Processor

In some embodiments, the platforms, systems, media, and methods described herein include a digital processor. In further embodiments, the digital processor includes one or more hardware central processing units (CPUs) or general purpose graphics processing units (GPGPUs) that carry out the device's functions. In still further embodiments, the digital processor further comprises an operating system configured to perform executable instructions. In some embodiments, the digital processor is optionally connected to a computer network. In further embodiments, the digital processor is optionally connected to the Internet such that it accesses the World Wide Web. In still further embodiments, the digital processor is optionally connected to a cloud computing infrastructure. In other embodiments, the digital processor is optionally connected to an intranet. In other embodiments, the digital processor is optionally connected to a data storage device. In accordance with the description herein, suitable digital processors include, by way of non-limiting examples, server computers, desktop computers, laptop computers, and vehicles.

In some embodiments, the digital processor includes an operating system configured to perform executable instructions. The operating system is, for example, software,

TABLE 1

| | | | Acc | | | | | |
|---|---|---|---|---|---|---|---|---|
| Error | Overall Depth Accuracy | Overall Depth (m) | Cam 1 Depth Accuracy | Cam 2 Depth Accuracy | Cam 3 Depth Accuracy | Cam 7 Depth Accuracy | Car Acc (3771 dets) | Ped Acc (17 dets) |
| Net Depth | 88.4 | 0.654 | 90.3 | 90.4 | 83.6 | 88.1 | 88.7 | 29.4 |
| 2D Mask Depth Median | 89.1 | 1.345 | 95.5 | 92.8 | 85.3 | 83.2 | 89.0 | 100.0 |
| 3D Mask Depth Median | 92.8 | 1.413 | 95.1 | 95.5 | 86.4 | 92.4 | 92.8 | 100.0 |

Further, the methods disclosed herein were tested using 3700 images of vehicle, wherein the Intersection of Union (IoU) metric results are listed in Table 2.

including programs and data, which manages the device's hardware and provides services for execution of applications. Those of skill in the art will recognize that suitable

TABLE 2

| IOU Threshold | Easy Ground Accuracy | Medium Ground Accuracy | Hard Ground Accuracy | Easy 3D Accuracy | Medium 3D Accuracy | Hard 3D Accuracy |
|---|---|---|---|---|---|---|
| 0.7 | 0.980165 | 0.894185 | 0.857885 | 0.957025 | 0.822177 | 0.775075 |
| 0.5 | 0.999174 | 0.966193 | 0.942607 | 0.995041 | 0.946924 | 0.924023 |
| 0.25 | 1 | 0.989182 | 0.976223 | 1 | 0.986139 | 0.971577 |

The above evaluated on KITTI dataset show superior performance of 3D object detection and bird's eye view detection for all categories of KITTI data (car, pedestrian and cyclist) in all difficulty levels (easy, medium, hard). The average precision (AP) achieved by the methods herein for 3D object detection on cars is 10.11%, 8.04% and 7.07%, for easy, medium, and hard difficulty levels, respectively. The average precision (AP) achieved by the methods herein for 3D object detection on pedestrian and cyclist are 22.67% and 28.98% better than the method 2 respectively. Evaluated on SUN-RGBD val set, the method of the current disclosure exhibits a 54.0% Mean Average Precision (mAP) which is 6.4% to 12% improvement from previous state-of-the-arts.

server operating systems include, by way of non-limiting examples, FreeBSD, OpenBSD, NetBSD®, Linux, Apple® Mac OS X Server®, Oracle® Solaris®, WindowsServer®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processor is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processor includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processor, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processor includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 25:
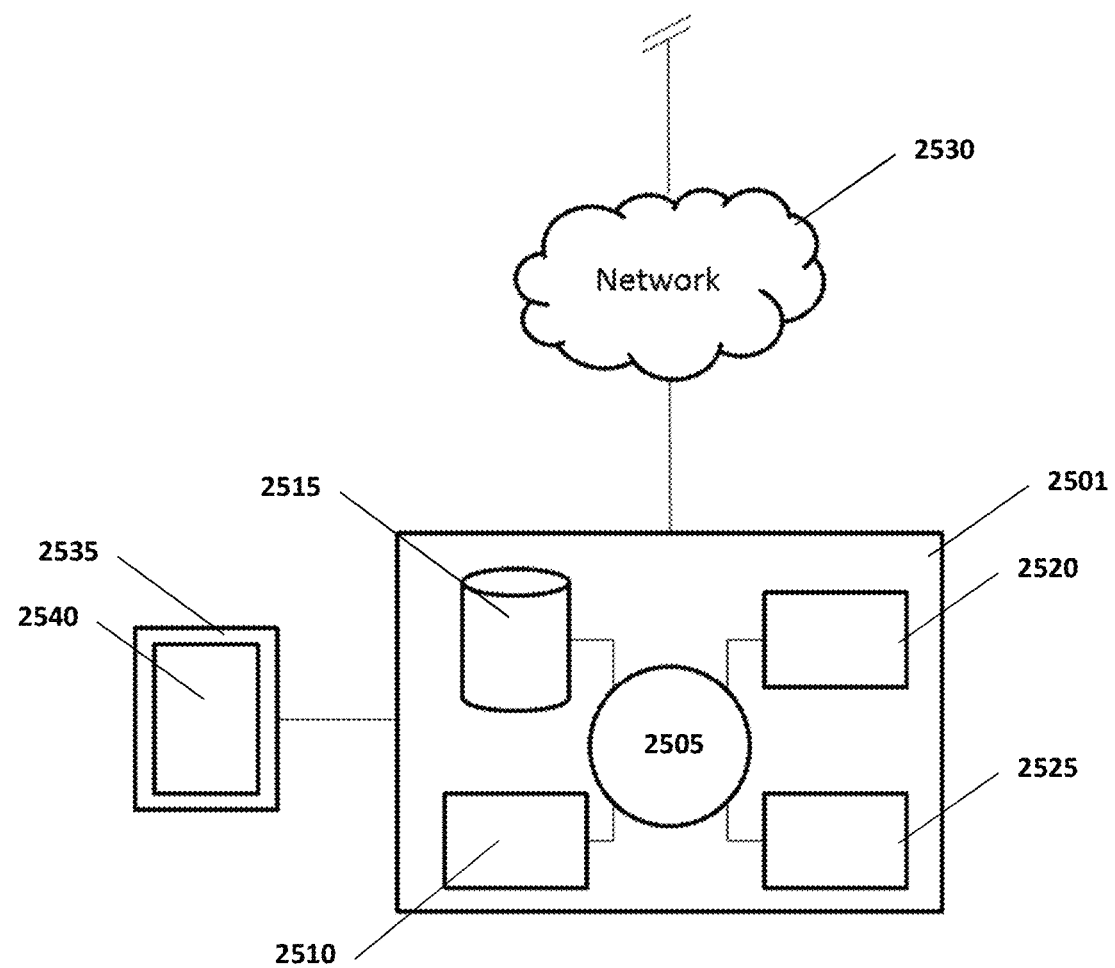
FIG. 25 shows a non-limiting schematic diagram of a digital processor; in this case, a device with one or more CPUs, a memory, a communication interface, and a display.

Referring to FIG. 25, in a particular embodiment, an exemplary digital processor 2501 is programmed or otherwise configured to perform three-dimensional perception in an autonomous robotic system. The device 2501 can regulate various aspects of the methods and systems the present disclosure. In this embodiment, the digital processor 2501 includes a central processing unit (CPU, also "processor" and "computer processor" herein) 2505, which can be a single core or multi core processor, or a plurality of processors for parallel processing. The digital processor 2501 also includes memory or memory location 2510 (e.g., random-access memory, read-only memory, flash memory), electronic storage unit 2515 (e.g., hard disk), communication interface 2520 (e.g., network adapter) for communicating with one or more other systems, and peripheral devices 2525, such as cache, other memory, data storage and/or electronic display adapters. The memory 2510, storage unit 2515, interface 2520 and peripheral devices 2525 are in communication with the CPU 2505 through a communication bus (solid lines), such as a motherboard. The storage unit 2515 can be a data storage unit (or data repository) for storing data. The digital processor 2501 can be operatively coupled to a computer network ("network") 2530 with the aid of the communication interface 2520. The network 2530 can be the Internet, an internet and/or extranet, or an intranet and/or extranet that is in communication with the Internet. The network 2530 in some cases is a telecommunication and/or data network. The network 2530 can include one or more computer servers, which can enable distributed computing, such as cloud computing. The network 2530, in some cases with the aid of the device 2501, can implement a peer-to-peer network, which may enable devices coupled to the device 2501 to behave as a client or a server.

Continuing to refer to FIG. 25, the CPU 2505 can execute a sequence of machine-readable instructions, which can be embodied in a program or software. The instructions may be stored in a memory location, such as the memory 2510. The instructions can be directed to the CPU 2505, which can subsequently program or otherwise configure the CPU 2505 to implement methods of the present disclosure. Examples of operations performed by the CPU 2505 can include fetch, decode, execute, and write back. The CPU 2505 can be part of a circuit, such as an integrated circuit. One or more other components of the device 2501 can be included in the circuit. In some cases, the circuit is an application specific integrated circuit (ASIC) or a field programmable gate array (FPGA).

Continuing to refer to FIG. 25, the storage unit 2515 can store files, such as drivers, libraries and saved programs. The storage unit 2515 can store user data, e.g., user preferences and user programs. The digital processor 2501 in some cases can include one or more additional data storage units that are external, such as located on a remote server that is in communication through an intranet or the Internet.

Continuing to refer to FIG. 25, the digital processor 2501 can communicate with one or more remote computer systems through the network 2530. For instance, the device 2501 can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processor 2501, such as, for example, on the memory 2510 or electronic storage unit 2515. The machine executable or machine readable code can be provided in the form of software. During use, the code can be executed by the processor 2505. In some cases, the code can be retrieved from the storage unit 2515 and stored on the memory 2510 for ready access by the processor 2505. In some situations, the electronic storage unit 2515 can be precluded, and machine-executable instructions are stored on memory 2510.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processor. In further embodiments, a computer readable storage medium is a tangible component of a digital processor. In still further embodiments, a computer readable storage medium is optionally removable from a digital processor. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processor's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of two and three dimensional information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

EXAMPLES

The following illustrative examples are representative of embodiments of the software applications, systems, and methods described herein and are not meant to be limiting in any way.

Example 1—Classifying a Pedestrian Behind a Parked Car

In one non-limiting example herein, a LiDAR on an autonomous vehicle captures a two-dimensional image data and three-dimensional depth data of the road it is driving on, using an optical camera, and a depth sensor, respectively. The system of the present disclosure generates an attention region in the two-dimensional image data corresponding to a pedestrian waiting to cross the street, wherein the pedestrian is partially obstructed from the perspective of the autonomous vehicle by a parked car. The system then extracts a three-dimensional frustum from the depth data corresponding to the attention region, wherein the frustum encompasses the pedestrian.

The system then generates and regresses an oriented three-dimensional boundary around the whole shape of the pedestrian although the pedestrian is partially hidden behind the parked car, and classifies the pedestrian as a potential road hazard. Knowing it speed and location, the autonomous vehicle calculates a safe braking deceleration to avoid the pedestrian.

While preferred embodiments of the present subject matter have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the subject matter described herein may be employed in practicing the invention.

Non-Limiting Embodiments

While object recognition on 2D images is getting more and more mature, 3D understanding is eagerly in demand yet largely underexplored. 3D object detection from RGB-D data is studied and captured by depth sensors in both indoor and outdoor environments. Different from previous deep learning methods that work on 2D RGB-D images or 3D voxels, which often obscure natural 3D patterns and invariances of 3D data, raw point clouds operate differently by popping up RGB-D scans. Although PointNet perform well for segmentation in small-scale point cloud, one key challenge is how to efficiently detect objects in large-scale scenes. Leveraging the wisdom of dimension reduction and mature 2D object detectors, a Frustum PointNet framework is developed that addresses the challenge. Evaluated on KIITI and SUN RGB-D 3D detection benchmarks, the methods provided herein outperform state of the arts by remarkable margins with high efficiency (running at 5 fps).

Recently, great progress has been made on 2D image understanding tasks, such as object detection and instance segmentation. However, beyond getting 2D bounding boxes or pixel masks, 3D understanding is eagerly in demand in many applications such as autonomous driving and augmented reality (AR). With the popularity of 3D sensors deployed on mobile devices and autonomous vehicles, more and more 3D data is captured and processed. Described herein are solutions to challenging and important 3D perception tasks 3D; namely, object detection which classifies the object category and estimates oriented 3D bounding boxes of physical objects from 3D sensor data.one of the most important 3D perception tasks 3D object detection which classifies the object category and estimates oriented 3D bounding boxes of physical objects from 3D sensor data.

How to represent point cloud data and what deep net architectures to use for 3D object detection remains an open problem. Most existing works convert 3D point cloud to images by projection or to volumetric grids by quantization and then apply convolutional networks. This data representation transformation, however, may obscure natural 3D patterns and invariances of the data. Recently, a number of methods have proposed to process point clouds directly without converting them to other formats. For example, proposed new types of deep net architectures, called Point-Nets, which have shown superior performance and efficiency in several 3D understanding tasks such as object classification and semantic segmentation.

While PointNets are capable of classifying a whole point cloud or predicting semantic class for each point in a point cloud, it is unclear how this architecture can be used for instance-level 3D object detection. The methods and devices herein address one key challenge: how to efficiently propose possible locations of 3D objects in a 3D space. Imitating the practice in image detection, it is straightforward to enumerate candidate 3D boxes by sliding windows, or by 3D region proposal networks such as. However, the computational complexity of 3D search typically grows cubically with respect to resolution and becomes too expensive for large scenes or real-time applications, such as autonomous driving.

Instead, the search space is reduced following the dimension reduction principle: to take advantage of mature 2D object detectors. First, extraction is performed of the 3D bounding frustum of an object by extruding 2D bounding boxes from image region detectors. Then, within the 3D space trimmed by each of the 3D frustums, object instance segmentation and amodal 3D bounding box regression are preformed, by two variants of PointNet, consecutively. The segmentation network predicts the 3D mask of the object of interest (a.k.a. instance segmentation); and the regression network estimates the amodal 3D bounding box (covering the entire object even if only part of it is visible).

In contrast to many previous works that treat RGB-D data simply as 2D maps for CNNs, the methods provided herein are more 3D-centric as the depth map is lifted to be a 3D point cloud and process the point cloud by 3D tools. This 3D-centric view enables new capabilities for exploring 3D data in a more effective manner. First, in the pipeline, a few transformations are applied successively on 3D coordinates, which align a point cloud into a sequence of more constrained and canonical frames. After the alignment, the job of 3D learners become easier since the pose variation in data has been factored out and 3D geometry patterns become more evident. Second, learning in 3D space allows us to better exploit the geometric and topological structure of 3D space by specifically tailored machine learning tools such as PointNet. In principle, all objects live in 3D space; therefore, many geometric structures, such as repetition, planarity, and symmetry, are more naturally parameterized and captured by learners that directly operate in 3D space. The usefulness of this 3D-centric network design philosophy has been supported by much recent experimental evidence.

The methods provided herein rank the first place on KITTI 3D object detection and bird's eye view detection leader boards on all categories. Compared with previous state of the art, the methods provided herein are 8.04% better on 3D car AP with high efficiency (running at 5 fps). The methods provided herein also fit well to indoor RGB-D data achievements include 8.9% and 6.4% better 3D mAP on SUN-RGBD while running one to three orders of magnitude faster. The key contributions of the methods provided herein are as follows: Disclosed herein is a novel framework for 3D object detection called Frustum PointNet. Disclosed herein are systems and methods to train 3D object detectors under the framework which achieve state-of-the-art performance on standard 3D object detection benchmarks. Provided herein are extensive quantitative evaluations to validate the design choices as well as rich qualitative results for understanding the strengths and limitations of the methods provided herein.

Others have approached the 3D detection problem by taking various ways to represent RGB-D data. Front view image based methods: take monocular RGB images and shape priors or occlusion patterns to infer 3D bounding boxes. Some methods represent depth data as 2D maps and applies CNNs to localize objects in 2D image. In comparison depth is represented as point cloud and use advanced 3D deep networks (PointNets) that can exploit 3D geometry more effectively.

MV3D projects LiDAR point cloud to bird's eye view and trains a region proposal network (RPN) for 3D bounding box proposal. However, the method lacks behind in detecting small objects such as pedestrians and cyclists and cannot easily adapt to scenes with multiple objects in vertical direction.

Some 3D based methods train 3D object classifiers by SVMs on hand-designed geometry features extracted from point cloud and then localize objects using sliding-window search. Some 3D based methods replace SVM with 3D CNN on voxelized 3D grids. Some designs new geometric features for 3D object detection in point cloud. Some 3D based methods convert point cloud of the entire scene into a volumetric grid and use 3D volumetric CNN for object proposal and classification. Computation cost for those methods is usually quite high due to the expensive cost of 3D convolutions and large 3D search space. Recently, a 3D based method proposes a 2D-driven 3D object detection method that is similar to the methods provided herein. However, they use hand-crafted features (based on histogram of point coordinates) with simply fully connected networks to regress 3D box location and pose, which is both slow in speed and sub-optimal in performance. In contrast, the devices and systems herein enable a more flexible and effective solution with deep 3D feature learning (PointNets).

Most existing works convert point cloud to images or volumetric forms before feature learning, voxelize point cloud into volumetric grids and generalize image CNNs to 3D CNNs. design more efficient 3D CNN or neural network architectures that exploit sparsity in point cloud. However, these CNN based methods still require quantification of point cloud with certain voxel resolution. Methods herein employ a novel type of network architectures (PointNets) that directly consumes raw point clouds without converting them to other formats. While PointNets have been applied to single object classification and semantic segmentation, the methods provided herein extend the architecture for the purpose of 3D object detection.

Given RGB-D data as input, the goal is to classify and localize objects in 3D space. The depth data, obtained from LiDAR or indoor depth sensors, is represented as a point cloud in the RGB camera coordinate. The projection matrix is also known to extract a 3D frustum from 2D image region. Each object is represented by a class (one among k predefined classes) and an amodal 3D bounding box. The amodal box bounds the complete object even if part of the object is occluded or truncated. The 3D box is parameterized by its size h, w, l, center cx, ci, cz, and orientation θ, φ, ψ relative to a predefined canonical pose for each category. In the implementation, only the heading angle θ around the up-axis for orientation is implemented.

The system for 3D object detection consists of three modules: frustum proposal, 3D instance segmentation, and 3D amodal bounding box estimation.

The resolution of data produced by most 3D sensors, especially real-time depth sensors, is still lower than RGB images from commodity cameras. Therefore, the systems, methods, and devices herein leverage mature 2D object detector to propose 2D object regions in RGB images as well as to classify objects.

With known camera projection matrix, a 2D bounding box can be lifted to a frustum (with near and far plane specified by depth sensor range) that defines a 3D search space for the object. All points within the frustum are then collected to form a frustum point cloud. Frustums may orient towards many different directions, which result in large variation in the placement of point clouds. The frustums are therefore normalized by rotating them toward a center view such that the center axis of the frustum is orthogonal to the image plane. This normalization helps to improve the rotation-invariance of the algorithm. The entire procedure for extracting frustum point clouds from RGB-D data is termed frustum proposal generation.

While the 3D detection framework is agnostic to the ex-act method for 2D region proposal, an SSD based model is adopted. The model weights are pre-trained on ImageNet classification and COCO object detection datasets and further fine-tune it on KITTI 2D object detection dataset to classify and predict amodal 2D boxes. More details of the 2D detector training are provided in supplementary.

Figure 26:
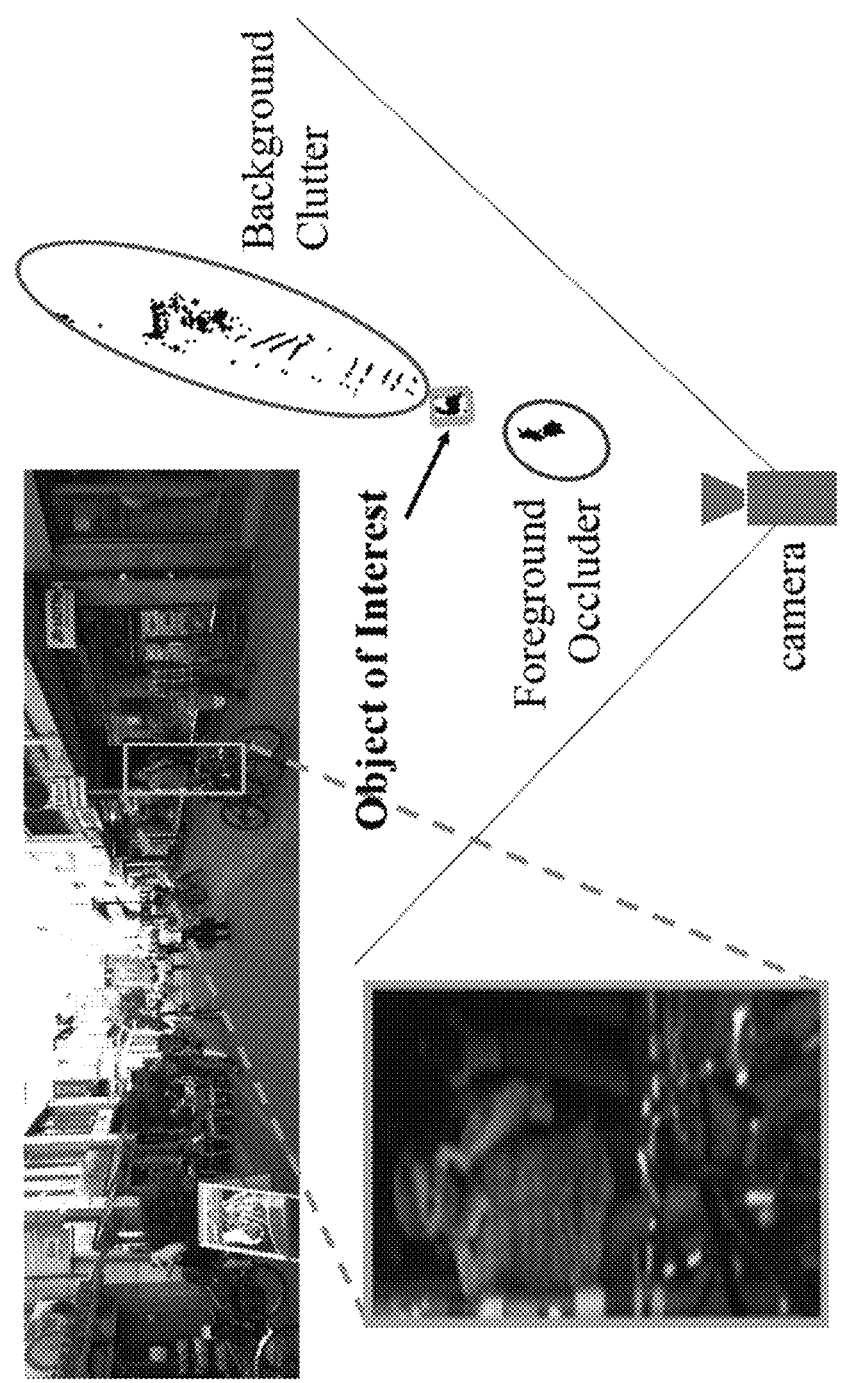
FIG. 26 shows a non-limiting RGB image with a region of interest that is differentiated from foreground occlusion and background clutter.
Figure 27:
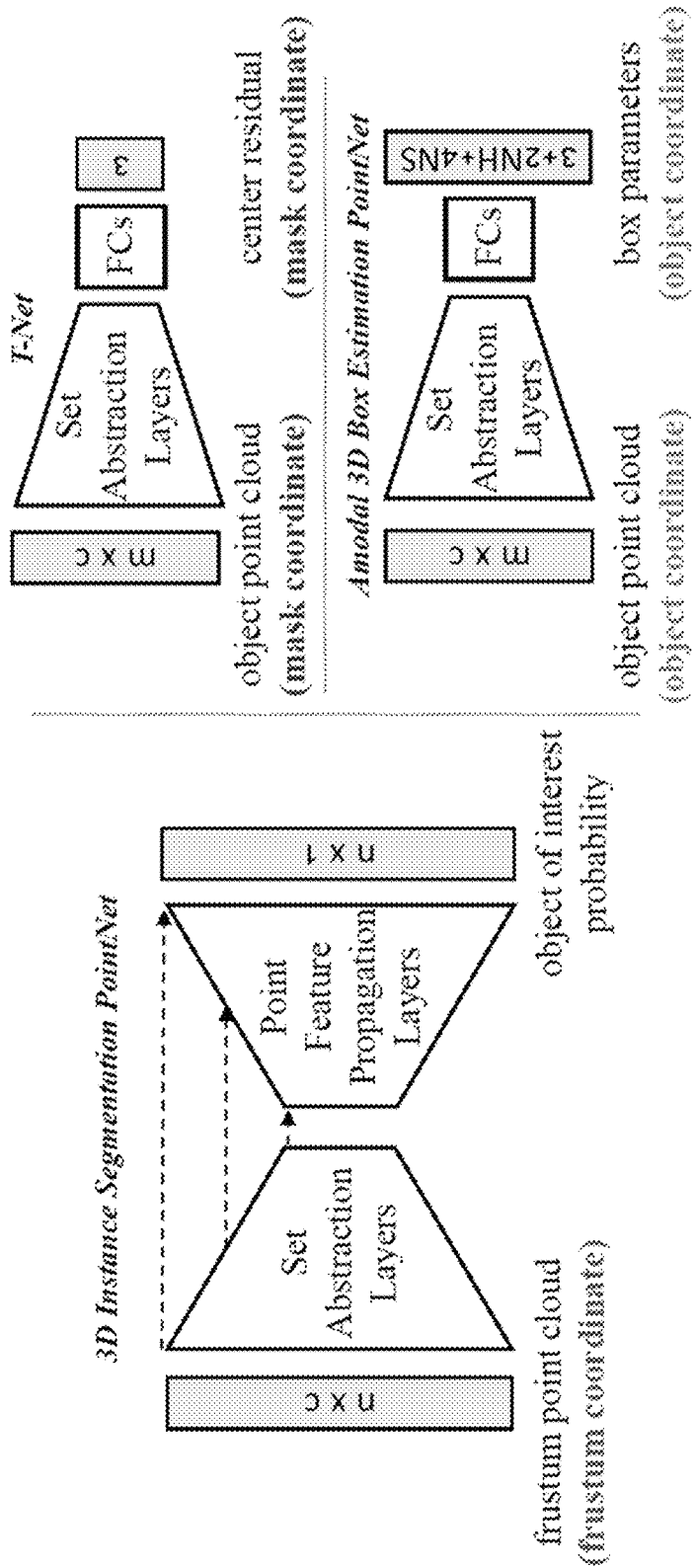
FIG. 27 shows a non-limiting schematic diagram of the architecture of PointNet++.

Given a 2D image region (and its corresponding 3D frustum), several methods might be used to obtain 3D location of the object: One straightforward solution is to directly regress 3D object location (e.g., by 3D bounding box) from depth map using 2D CNNs. However, this problem is not easy as occluding objects and background clutter is com-mon in natural scenes, per FIG. 26, which may severely distract the 3D localization task. Because objects are naturally separated in physical space, segmentation in 3D point cloud is much more natural and easier than that in images where pixels from distant objects can be near-by to each other. Having observed this fact, segment in-stances in 3D point cloud occurs instead of in 2D image or depth map. Similar to Mask-RCNN that achieves instance segmentation by binary classification of pixels in image regions, the systems, methods, and devices herein implement 3D instance segmentation using PointNet-based network on point clouds in frustums. An architectures and IO for Point-Net++ models with set abstraction layers and feature propagation layers for segmentation is shown in FIG. 27.

Based on 3D instance segmentation, the devices, systems, and methods herein achieve residual based 3D localization. That is, rather than regressing the absolute 3D location of the object whose offset from sensor may vary in large ranges (e.g. from 5 m to beyond 50 m in KITTI data), the 3D bounding box center is predicted in a local coordinate system—3D mask coordinates.

3D Instance Segmentation PointNet. The network takes a point cloud in the frustum and predicts a probability score for each point that indicates how likely the point belongs to the object of interest. Note that each frustum contains exactly one object of interest. Here those "other" points could be points of non-relevant areas (such as ground, vegetation) or other instances that occlude or are behind the object of interest Similar to that in 2D instance segmentation, depending on the position of the frustum, object points in one frustum may become clutter or occluding points in another. Therefore, the segmentation PointNet is learning the occlusion and clutter patterns as well as recognizing the geometry for the object of a certain category.

In multi-class detection case, the semantics from 2D detector are also leveraged for better instance segmentation. For example, if the object of interest is a pedestrian, then the segmentation network can use this prior to find geometries that look like a person. Specifically, the semantic category is encoded as a one-hot class vector (k dimensional for the pre-defined k categories) and concatenate the one-hot vector to the intermediate point cloud features. More details of the specific architectures are described in supplementary.

After 3D instance segmentation, points that are classified as the object of interest are extracted. Having obtained these segmented object points, the system then normalizes its coordinates to boost the translational invari. Basic architectures and I0 for PointNets. Architecture is illustrated for PointNet++(v2) models with set abstraction layers and feature propagation layers (for instance of the algorithm, following the same rationale as in the frustum proposal step. the point cloud is transformed into a local coordinate by subtracting XYZ values by its centroid. This is illustrated in. The point cloud is not scaled because the bounding sphere size of a partial point cloud can be greatly affected by viewpoints and the real size of point cloud helps the box size estimation.

The coordinate transformations are critical for 3D detection result as shown in Table 3.

TABLE 3

| frustum rot. | mask centralize | t-net | accuracy |
|---|---|---|---|
| X | | | 48.1 |
| | X | | 64.6 |
| X | X | | 71.5 |
| X | X | X | 74.3 |

Given the segmented object points (in 3D mask coordinate), this module estimates the object's amodal oriented 3D bounding box by using a box regression PointNet together with a preprocessing transformer network.

Learning-based 3D Alignment by T-Net Even though segmented object points have been aligned according to their centroid position, the origin of the mask coordinate frame may still be quite far from the amodal box center. As such, the devices, methods, and systems herein use a light-weight regression PointNet (T-Net) to estimate the true center of the complete object and then transform the coordinate such that the predicted center becomes the origin.

The architecture and training of the T-Net is similar to the T-Net, which can be thought as a special type of spatial transformer network (STN). However, different from the original STN that has no direct supervision on transformation, the translation net-work are explicitly supervised to predict center residual from mask coordinate origin to real object center.

Amodal 3D Box Estimation PointNet The box estimation network predicts amodal bounding boxes (for entire object even if part of it is unseen) for objects given object point cloud in 3D object coordinate. The network architecture is similar to that for object classification, however the output is no longer object class scores but parameters for 3D bounding box.

A 3D bounding box is parameterized by its center (ex, cg, ez), size (h, w, l) and heading angle 9 (along up-axis). Employed herein is a "residual" approach for box center estimation. Center residual predicted by box estimation network is combined with previous center residual from T-Net and the masked points' centroid to recover an absolute center (Eq. 1). For box size and heading angle, a hybrid of classification and regression formulations are used. Specifically pre-defined NS size templates and NH equally split angle bins are used. The model will both classify size/heading (NS scores for size, NH scores for heading) to those pre-defined categories as well as predict residual numbers for each category (3×NS residual dimensions for height, width, length, NH residual angles for heading). In the end the net outputs 3+4×NS+2×NH numbers in total. The three nets involved (3D instance segmentation PointNet, T-Net and amodal box estimation PointNet) with multi-task losses (as in Eq. 2) are jointly optimized. Softmax is used for all classification tasks and smoothed-/1 (huber) loss is used for all regression cases.

$$C_{pred}=C_{mask}+\Delta C_{t\text{-}net}+\Delta C_{box\text{-}net}$$

While the 3D bounding box parameterization is compact and complete, learning is not optimized for final 3D box accuracy—center, size, and heading have separate loss terms. Imagine cases where center and size are accurately predicted but heading angle if off—the 3D IoU with ground truth box will then be dominated by the angle error. Ideally all three terms (center, size, and heading) should be jointly optimized for best 3D box estimation (under IoU metric). To resolve this problem a novel regularization loss, the corner loss, is used.

In essence, the corner loss (defined in Eq. 3) is the sum of distances between eight corners of a predicted box and a ground truth box. Since the corner positions are the combined results from center, size and heading, the corner loss is able to help regularize the multi-task training for those parameters.

To compute corner loss, NS×NH "anchor" boxes are constructed from all size templates and heading angle classes. The anchor boxes are then translated to the estimated box center. The anchor box corners are denoted as /13, where i, j, k are indices for size class, heading class and corner order (predefined) respectively. To avoid large penalty from flipped heading estimation, distance to corners (Pr) are further computed from the flipped ground truth box and use the minimum of the original and flipped cases. (Ski, which is one for the ground truth size/heading class and zero else wise, is a two-dimensional mask used to select the distance term.

Experiments are divided into three parts. First the state-of-the-art methods for 3D object detection on KITTI and SUN-RGBD are compared. Second, in-depth validation analysis is performed. Last, qualitative results are shown and discuss the strengths and limitations of the methods.

3D object detector is evaluated on KITTI and SUN-RGBD benchmarks for 3D object detection. Significantly better results have been compared with state-of-the-art methods.

KITTI Table shows the performance of the 3D detector on KITTI test set. The devices, system, and methods herein outperform previous state-of-the-art methods by a large margin. While MV3D uses multi-view feature aggregation and sophisticated multi-sensor fusion strategy, the methods provided herein based on PointNet (v1) and PointNet++(v2) backbone are much cleaner in design.

The method's performance on 3D object localization (bird's eye view) in Table 4. In the 3D localization task bounding boxes are projected to bird's eye view plane and IoU is evaluated on oriented 2D boxes. the methods provided herein significantly outperform previous works which include DoBEM and MV3D that use CNNs on projected LiDAR images, as well as 3D FCN that uses 3D CNNs on voxelized point cloud. Two unpublished methods (AVOD and NVLidarNet) that are available on KITTI leader board were also compared.

TABLE 4

| Method | Cars Easy | Cars Moderate | Cars Hard | Pedestrians Easy | Pedestrians Moderate | Pedestrians Hard | Cyclists Easy | Cyclists Moderate | Cyclists Hard |
|---|---|---|---|---|---|---|---|---|---|
| DoBEM | 36.49 | 36.95 | 38.1 | | | | | | |
| 3D FCN | 69.94 | 62.54 | 55.94 | | | | | | |
| MV3D | 86.02 | 76.9 | 68.94 | | | | | | |
| AVOD | 85.51 | 77.57 | 69.65 | 37.53 | 30.46 | 28.3 | 44.06 | 37.11 | 32.74 |
| NVLidarNet | 84.44 | 80.04 | 74.31 | 45.21 | 37.81 | 33.82 | 63.95 | 47.97 | 44.51 |
| Disclosed-1 | 87.28 | 77.09 | 67.9 | 55.26 | 47.56 | 42.57 | 73.42 | 59.87 | 52.88 |
| Disclosed-2 | 88.7 | 84 | 75.33 | 58.09 | 50.22 | 47.2 | 75.38 | 61.96 | 54.68 |

The output of the network is visualized where accurate 3D instance segmentation and box prediction were observed even under very challenging cases.

SUN-RGBD Most previous 3D detection works specialize either on outdoor LiDAR scans where objects are well separated in space and the point cloud is sparse (so that it's feasible for bird's eye projection), or on indoor depth maps that are regular images with dense pixel values such that image CNNs can be easily applied. However, methods designed for bird's eye view may be incapable for indoor rooms where multiple objects often exist together in vertical space. On the other hand, indoor focused methods could find it hard to apply to sparse and large-scale point cloud from LiDAR scans.

In contrast, the frustum-based PointNet is a generic framework for both outdoor and indoor 3D object detection. By applying the same pipeline, the KITTI data set was used to achieve state-of-the-art performance on SUN-RGBD benchmark (Table 5) with significantly higher mAP as well as much faster inference speed (one to three orders of magnitude faster).

the 2D mask. In comparison, the 3D instance segmentation form improved results, which greatly ease the next module in finer localization and bounding box regression.

Figure 29:
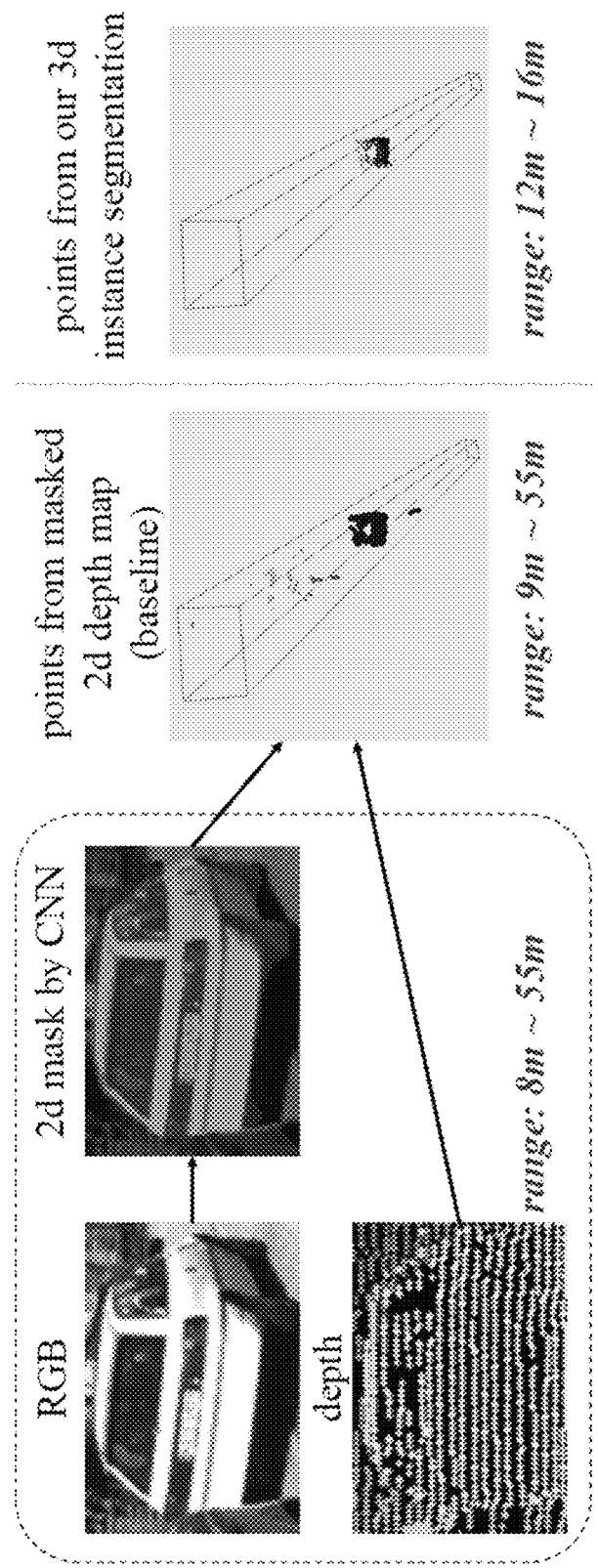
FIG. 29 shows non-limiting images of 2D and 3D marks.

Not surprisingly, the model gets much worse results than the main method, which indicates the critical effect of the 3D instance segmentation module. In addition, testing to use 2D mask for the Point-Nets was performed. In the fourth row of Table 6, instead of 3D segmentation point cloud from 2D masked depth map (as in FIG. 29 baseline) was used for bounding box estimation. However, since 2D mask is not able to cleanly segment the 3D object, the performance is more than 12% worse than that with the 3D segmentation. On the other hand, a combined usage of 2D and 3D masks applying 3D segmentation on point cloud from 2D masked depth map—also shows slightly worse result than the main method probably due to the accumulated error from inaccurate 2D mask prediction. FIG. 29 shows a comparison between 2D and 3D masks with typical 2D region proposal from KITTI val set with both 2D (on RGB image region) and 3D (on frustum point cloud) instance segmentation results.

TABLE 5

| | bathtub | bed | bookshelf | chair | desk | dresser | nightstand | sofa | table | toilet | Runtime | mAP |
|---|---|---|---|---|---|---|---|---|---|---|---|---|
| DSS | 44.2 | 78.8 | 11.9 | 61.2 | 20.5 | 6.4 | 15.4 | 53.5 | 50.3 | 78.9 | 19.55 s | 42.1 |
| COG | 58.3 | 63.7 | 31.8 | 62.2 | 45.2 | 15.5 | 27.4 | 51.0 | 51.3 | 70.1 | 10-30 min | 47.6 |
| 2D-driven | 43.5 | 64.5 | 31.4 | 48.3 | 27.9 | 25.9 | 41.9 | 50.4 | 37.0 | 80.4 | 4.15 s | 45.1 |
| Disclosure | 43.3 | 81.1 | 33.3 | 64.2 | 24.7 | 32.0 | 58.1 | 61.1 | 51.1 | 90.9 | 0.12 s | 54.0 |

Unless otherwise noted, all experiments described herein are based on the (v1) model on KITTI training data with train/A/al split as in [c]. To decouple the influence of 2D object detectors, ground truth 2D boxes are used as region proposals and use 3D box estimation accuracy (IoU threshold 0.7) as evaluation metric.

Comparing with alternative approaches for 3D detection. In this part a few CNN-based baseline approaches are evaluated as well as ablated version and variants of the pipelines using 2D masks.

The baseline methods trained VGG models on ground truth boxes of RGB-D images and adopt the same box parameter and loss functions as the main method. While the model in first row directly estimates box location and parameters from vanilla RGB-D image patch, the other one (second row) uses a FCN for 2D mask estimation (as that in Mask-RCNN) and only features from the masked region for prediction. The depth values are also translated by subtracting the median depth within the 2D mask. However, both CNN baselines get far worse results compared to the main method.

While estimated 2D mask appears in high quality on RGB image, there are still lots of clutter and foreground points in

TABLE 6

| network arch. | mask | depth representation | accuracy |
|---|---|---|---|
| ConvNet | — | image | 18.3 |
| ConvNet | 2D | image | 27.4 |
| PointNet | — | point cloud | 33.5 |
| PointNet | 2D | point cloud | 61.6 |
| PointNet | 3D | point cloud | 74.3 |
| PointNet | 2D + 3D | point cloud | 70.0 |

PointNet takes a few key coordinate transformations to canonicalize the point cloud for more effective learning. Table 7 shows how each normalization step helps for 3D detection. Both frustum rotation (such that all frustums are in front of camera with similar XYZ distributions) and mask centroid subtraction (such that object points have much smaller and canonical XYZ) matter a lot. In addition, an extra step to align object point cloud to object center by T-Net also contributes significantly to the performance.

TABLE 7

| frustum rot. | mask centralize | t-net | accuracy |
|---|---|---|---|
| X | | | 48.1 |
| | X | | 64.6 |
| X | X | | 71.5 |
| X | X | X | 74.3 |

Table 8 compares different loss options and show that a combination of "cls-reg" loss (the classification and residual regression approach for heading and size regression) and a regularizing corner loss achieves the best result.

TABLE 8

| loss type | regularization | accuracy |
|---|---|---|
| regression only | — | 62.9 |
| cls-reg | — | 71.8 |
| cls-reg (normalized) | — | 72.2 |
| cls-reg (normalized) | corner loss | 74.3 |

The naive baseline using regression loss only achieves unsatisfactory result because the number to regress to can be pretty large (considering object size from 0.2 m to 5 m). In comparison, the cls-reg loss and a normalized version (residual is normalized by heading bin size or template shape size) of it achieved much better performance. Adding the corner loss further helps optimization (with loss weight y=10).

Comparisons between 2D and 3D masks. A typical 2D region proposal from KITTI val set with both 2D (on RGB image region) and 3D (on frustum point cloud) instance segmentation results are shown.

Figure 28:
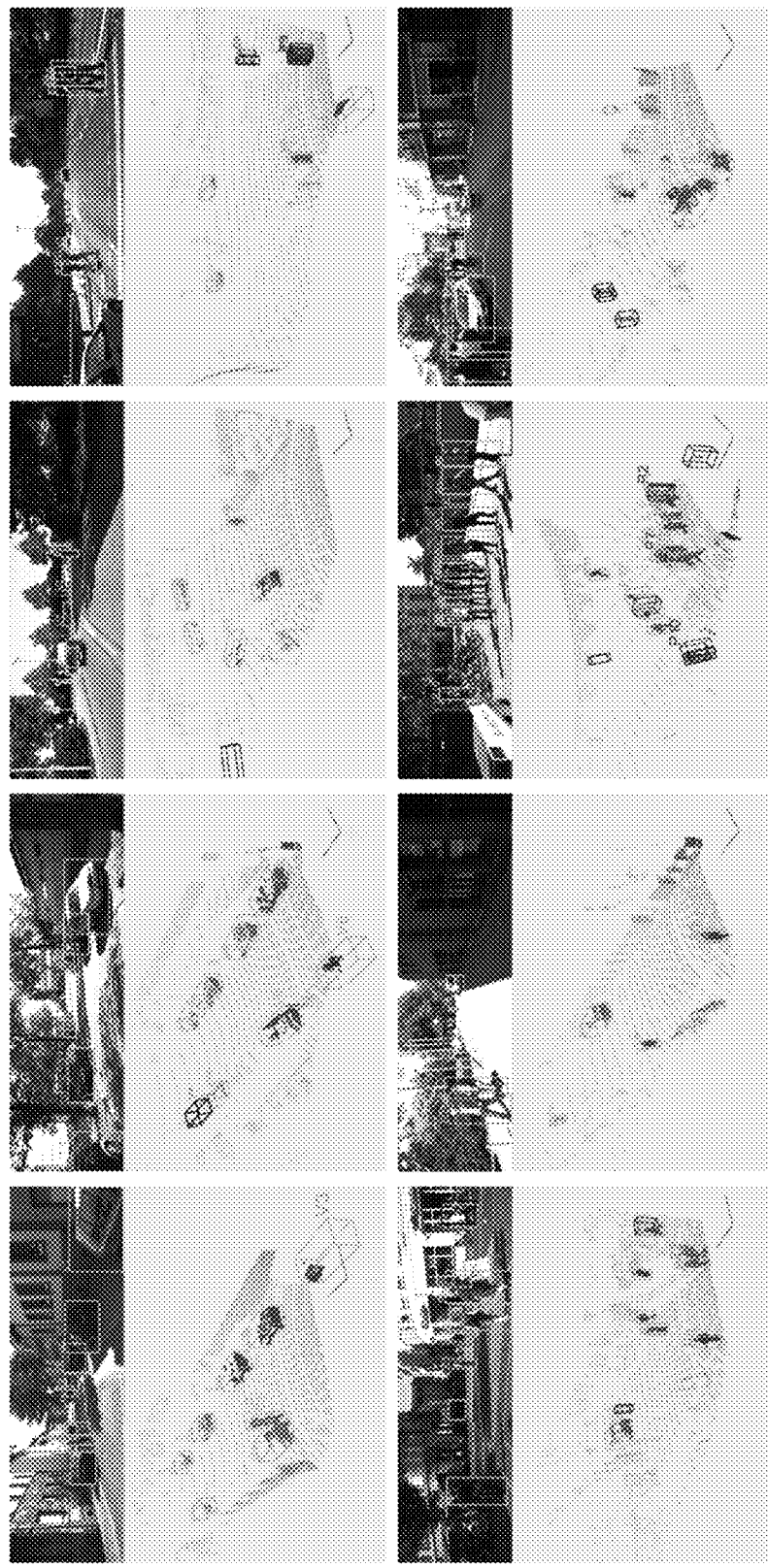
FIG. 28 shows non-limiting images of frustum PointNet results on KITTI val set.

FIG. 28 shows representative outputs of the frustum PointNet model. For simple cases of non-occluded objects in reasonable distance, the model outputs remarkably accurate 3D instance segmentation mask and 3D bounding boxes. Second, the model can even predict correctly posed amodal 3D box from partial data (e.g. for the case of parallel parked cars) with few points. Even humans find it very difficult to annotate such results with point cloud data only. Third, in some cases that seem very challenging in images with lots of nearby or even overlapping 2D boxes, when converted to 3D space, the localization becomes much easier.

The first common mistake is due to inaccurate pose and size estimation in sparse point cloud (sometimes less than 5 points).

The second type of challenge is when there are multiple instances from the same category in a frustum (like two persons standing by). Since the current pipeline assumes a single object of interest in each frustum, it may get confused when multiple instances appear and thus outputs mixed segmentation results.

Thirdly, sometimes the 2D detector misses objects due to dark lighting or strong occlusion. Since the frustum proposal is based on region proposal, no 3D object will be detected given the absence of 2D detection. However, the PointNet based instance segmentation and amodal 3D box estimation net-works are not restricted to image based proposals. The same framework can also be applied to point cloud in regions proposed by bird's eye view (by MV3D for example).

What is claimed is:

1. A computer-implemented method of implementing three-dimensional perception in an autonomous robotic system, the method comprising:
    a) receiving, at a processor, two-dimensional image data from an optical camera;
    b) generating, by the processor, an attention region in the two-dimensional image data, the attention region marking an object of interest;
    c) receiving, at the processor, three-dimensional depth data from a depth sensor, the depth data corresponding to the image data;
    d) extracting, by the processor, a three-dimensional frustum from the depth data corresponding to the attention region; and
    e) applying, by the processor, a deep learning model to the frustum to:
        i) generate and regress an oriented three-dimensional boundary for the object of interest; and
        ii) classify the object of interest based on a combination of features from the attention region of the two-dimensional image data and the three-dimensional depth data within and around the regressed boundary.
2. The method of claim 1, wherein the classification the object of interest is further based on at least one of the two-dimensional image data and the three-dimensional depth data.
3. The method of claim 1, wherein the autonomous robotic system is an autonomous vehicle.
4. The method of claim 1, wherein the two-dimensional image data is RGB image data.
5. The method of claim 1, wherein the two-dimensional image data is IR image data.
6. The method of claim 1, wherein the depth sensor comprises a LiDAR.
7. The method of claim 6, wherein the three-dimensional depth data comprises a sparse point cloud.
8. The method of claim 1, wherein the depth sensor comprises a stereo camera or a time-of-flight sensor.
9. The method of claim 8, wherein the three-dimensional depth data comprises a dense depth map.
10. The method of claim 1, wherein the deep learning model comprises a PointNet.
11. The method of claim 1, wherein the deep learning model comprises a three-dimensional convolutional neural network on voxelized volumetric grids of the point cloud in frustum.
12. The method of claim 1, wherein the deep learning model comprises a two-dimensional convolutional neural network on bird's eye view projection of the point cloud in frustum.
13. The method of claim 1, wherein the deep learning model comprises a recurrent neural network on the sequence of the three-dimensional points from close to distant.
14. The method of claim 1, wherein the classifying comprises semantic classification to apply a category label to the object of interest.
15. An autonomous robotic system comprising: an optical camera, a depth sensor, a memory, and at least one processor configured to:
    a) receive two-dimensional image data from the optical camera;
    b) generate an attention region in the two-dimensional image data, the attention region marking an object of interest;
    c) receive three-dimensional depth data from the depth sensor, the depth data corresponding to the image data;
    d) extract a three-dimensional frustum from the depth data corresponding to the attention region; and e) apply a deep learning model to the frustum to:
   i) generate and regress an oriented three-dimensional boundary for the object of interest; and
   ii) classify the object of interest based on a combination of features from the attention region of the two-dimensional image data and the three-dimensional depth data within and around the regressed boundary.

16. The system of claim 15, wherein the classification the object of interest is further based on at least one of the two-dimensional image data and the three-dimensional depth data.

17. The system of claim 15, wherein the autonomous robotic system is an autonomous vehicle.

18. The system of claim 15, wherein the two-dimensional image data is RGB image data.

19. The system of claim 15, wherein the two-dimensional image data is IR image data.

20. The system of claim 15, wherein the depth sensor comprises a LiDAR.

21. The system of claim 20, wherein the three-dimensional depth data comprises a sparse point cloud.

22. The system of claim 15, wherein the depth sensor comprises a stereo camera or a time-of-flight sensor.

23. The system of claim 22, wherein the three-dimensional depth data comprises a dense depth map.

24. The system of claim 15, wherein the deep learning model comprises a PointNet.

25. The system of claim 15, wherein the deep learning model comprises a three-dimensional convolutional neural network on voxelized volumetric grids of the point cloud in frustum.

26. The system of claim 15, wherein the deep learning model comprises a two-dimensional convolutional neural network on bird's eye view projection of the point cloud in frustum.

27. The system of claim 15, wherein the deep learning model comprises a recurrent neural network on the sequence of the three-dimensional points from close to distant.

28. The system of claim 15, wherein the classifying comprises semantic classification to apply a category label to the object of interest.

* * * * *